(12) United States Patent
Paik

(10) Patent No.: US 6,961,626 B1
(45) Date of Patent: Nov. 1, 2005

(54) DYNAMIC OFFSET AND FEEDBACK THRESHOLD

(75) Inventor: Young Jeen Paik, Campbell, CA (US)

(73) Assignee: Applied Materials, INC, Santa Clara, CA (US)

( * ) Notice: Subject to any disclaimer, the term of this patent is extended or adjusted under 35 U.S.C. 154(b) by 120 days.

(21) Appl. No.: 10/855,711

(22) Filed: May 28, 2004

(51) Int. Cl.[7] .......................... G05B 13/02; G06F 19/00; G01N 37/00
(52) U.S. Cl. .................. 700/31; 700/33; 700/34; 700/51; 700/109; 702/84
(58) Field of Search ................. 700/28–34, 44, 700/45, 51, 108–110; 702/81–84

(56) References Cited

U.S. PATENT DOCUMENTS

| | | |
|---|---|---|
| 3,208,485 A | 9/1965 | Noltingk |
| 3,229,198 A | 1/1966 | Libby |
| 3,767,900 A | 10/1973 | Chao et al. |
| 3,920,965 A | 11/1975 | Sohrwardy |
| 4,000,458 A | 12/1976 | Miller et al. |
| 4,207,520 A | 6/1980 | Flora et al. |
| 4,209,744 A | 6/1980 | Gerasimov et al. |
| 4,302,721 A | 11/1981 | Urbanek et al. |
| 4,368,510 A | 1/1983 | Anderson |
| 4,609,870 A | 9/1986 | Lale et al. |
| 4,616,308 A | 10/1986 | Morshedi et al. |
| 4,663,703 A | 5/1987 | Axelby et al. |
| 4,698,766 A | 10/1987 | Entwistle et al. |
| 4,750,141 A | 6/1988 | Judell et al. |
| 4,755,753 A | 7/1988 | Chern |
| 4,757,259 A | 7/1988 | Charpentier |
| 4,796,194 A | 1/1989 | Atherton |
| 4,901,218 A | 2/1990 | Cornwell |
| 4,938,600 A | 7/1990 | Into |
| 4,957,605 A | 9/1990 | Hurwitt et al. |
| 4,967,381 A | 10/1990 | Lane et al. |
| 5,089,970 A | 2/1992 | Lee et al. |

(Continued)

FOREIGN PATENT DOCUMENTS

| | | |
|---|---|---|
| CA | 2050247 | 8/1991 |
| CA | 2165847 | 8/1991 |

(Continued)

OTHER PUBLICATIONS

US 6,150,664, 11/2000, Su (withdrawn)
Sep. 15, 2004. Office Action for U.S. Appl. No. 10/632,107, filed Aug. 1, 2003.

(Continued)

Primary Examiner—Leo Picard
Assistant Examiner—Ryan Jarrett
(74) Attorney, Agent, or Firm—Wilmer Cutler Pickering Hale & Dorr

(57) ABSTRACT

A method, system and medium are provided for enabling improved feedback and feedforward control. An error, or deviation from target result, is observed during manufacture of semiconductor chips. The error within standard deviation is caused by two components: a white noise component and a signal component (such as systematic errors). The white noise component is random noise and therefore is relatively non-controllable. The systematic error, in contrast, may be controlled by changing the control parameters. A ratio between the two components is calculated autoregressively. Based on the ratio and using the observed or measured error, the actual value of the error caused by the signal component is calculated utilizing an autoregressive stochastic sequence. The actual value of the error is then used in determining when and how to change the control parameters. The autoregressive stochastic sequence addresses the issue of real-time control of the effects of run-to-run deviations, and provides a mechanism that can extract white noise from the statistical process variance in real time. This results in an ability to provide tighter control of feedback and feedforward variations.

27 Claims, 6 Drawing Sheets

U.S. PATENT DOCUMENTS

| | | |
|---|---|---|
| 5,108,570 A | 4/1992 | Wang |
| 5,208,765 A | 5/1993 | Turnbull |
| 5,220,517 A | 6/1993 | Sierk et al. |
| 5,226,118 A | 7/1993 | Baker et al. |
| 5,231,585 A | 7/1993 | Kobayashi et al. |
| 5,236,868 A | 8/1993 | Nulman |
| 5,240,552 A | 8/1993 | Yu et al. |
| 5,260,868 A | 11/1993 | Gupta et al. |
| 5,270,222 A | 12/1993 | Moslehi |
| 5,283,141 A | 2/1994 | Yoon et al. |
| 5,295,242 A | 3/1994 | Mashruwala et al. |
| 5,309,221 A | 5/1994 | Fischer et al. |
| 5,329,463 A | 7/1994 | Sierk et al. |
| 5,338,630 A | 8/1994 | Yoon et al. |
| 5,347,446 A | 9/1994 | Iino et al. |
| 5,367,624 A | 11/1994 | Cooper |
| 5,369,544 A | 11/1994 | Mastrangelo |
| 5,375,064 A | 12/1994 | Bollinger |
| 5,398,336 A | 3/1995 | Tantry et al. |
| 5,402,367 A | 3/1995 | Sullivan et al. |
| 5,408,405 A | 4/1995 | Mozumder et al. |
| 5,410,473 A | 4/1995 | Kaneko et al. |
| 5,420,796 A | 5/1995 | Weling et al. |
| 5,427,878 A | 6/1995 | Corliss |
| 5,444,837 A | 8/1995 | Bomans et al. |
| 5,469,361 A | 11/1995 | Moyne |
| 5,485,082 A | 1/1996 | Wisspeintner et al. |
| 5,490,097 A | 2/1996 | Swenson et al. |
| 5,495,417 A | 2/1996 | Fuduka et al. |
| 5,497,316 A | 3/1996 | Sierk et al. |
| 5,497,381 A | 3/1996 | O'Donoghue et al. |
| 5,503,707 A | 4/1996 | Maung et al. |
| 5,508,947 A | 4/1996 | Sierk et al. |
| 5,511,005 A | 4/1996 | Abbe et al. |
| 5,519,605 A | 5/1996 | Cawlfield |
| 5,525,808 A | 6/1996 | Irie et al. |
| 5,526,293 A | 6/1996 | Mozumder et al. |
| 5,534,289 A | 7/1996 | Bilder et al. |
| 5,541,510 A | 7/1996 | Danielson |
| 5,546,312 A | 8/1996 | Mozumder et al. |
| 5,553,195 A | 9/1996 | Meijer |
| 5,586,039 A | 12/1996 | Hirsch et al. |
| 5,599,423 A | 2/1997 | Parker et al. |
| 5,602,492 A | 2/1997 | Cresswell et al. |
| 5,603,707 A | 2/1997 | Trombetta et al. |
| 5,617,023 A | 4/1997 | Skalski |
| 5,627,083 A | 5/1997 | Tounai |
| 5,629,216 A | 5/1997 | Wijaranakula et al. |
| 5,642,296 A | 6/1997 | Saxena |
| 5,646,870 A | 7/1997 | Krivokapic et al. |
| 5,649,169 A | 7/1997 | Berezin et al. |
| 5,654,903 A | 8/1997 | Reitman et al. |
| 5,655,951 A | 8/1997 | Meikle et al. |
| 5,657,254 A | 8/1997 | Sierk et al. |
| 5,661,669 A | 8/1997 | Mozumder et al. |
| 5,663,797 A | 9/1997 | Sandhu |
| 5,664,987 A | 9/1997 | Renteln |
| 5,665,199 A | 9/1997 | Sahota et al. |
| 5,665,214 A | 9/1997 | Iturralde |
| 5,666,297 A | 9/1997 | Britt et al. |
| 5,667,424 A | 9/1997 | Pan |
| 5,674,787 A | 10/1997 | Zhao et al. |
| 5,694,325 A | 12/1997 | Fukuda et al. |
| 5,695,810 A | 12/1997 | Dubin et al. |
| 5,698,989 A | 12/1997 | Nulman |
| 5,719,495 A | 2/1998 | Moslehi |
| 5,719,796 A | 2/1998 | Chen |
| 5,735,055 A | 4/1998 | Hochbein et al. |
| 5,740,033 A * | 4/1998 | Wassick et al. ............... 700/29 |
| 5,740,429 A | 4/1998 | Wang et al. |
| 5,751,582 A | 5/1998 | Saxena et al. |
| 5,754,297 A | 5/1998 | Nulman |
| 5,761,064 A | 6/1998 | La et al. |
| 5,761,065 A | 6/1998 | Kittler et al. |
| 5,764,543 A | 6/1998 | Kennedy |
| 5,777,901 A | 7/1998 | Berezin et al. |
| 5,787,021 A | 7/1998 | Samaha |
| 5,787,269 A | 7/1998 | Hyodo |
| 5,808,303 A | 9/1998 | Schlagheck et al. |
| 5,812,407 A | 9/1998 | Sato et al. |
| 5,823,854 A | 10/1998 | Chen |
| 5,824,599 A | 10/1998 | Schacham-Diamand et al. |
| 5,825,356 A | 10/1998 | Habib et al. |
| 5,825,913 A | 10/1998 | Rostami et al. |
| 5,828,778 A | 10/1998 | Hagi et al. |
| 5,831,851 A | 11/1998 | Eastburn et al. |
| 5,832,224 A | 11/1998 | Fehskens et al. |
| 5,838,595 A | 11/1998 | Sullivan et al. |
| 5,838,951 A | 11/1998 | Song |
| 5,844,554 A | 12/1998 | Geller et al. |
| 5,857,258 A | 1/1999 | Penzes et al. |
| 5,859,777 A | 1/1999 | Yokoyama et al. |
| 5,859,964 A | 1/1999 | Wang et al. |
| 5,859,975 A | 1/1999 | Brewer et al. |
| 5,862,054 A | 1/1999 | Li |
| 5,863,807 A | 1/1999 | Jang et al. |
| 5,867,389 A | 2/1999 | Hamada et al. |
| 5,870,306 A | 2/1999 | Harada |
| 5,871,805 A | 2/1999 | Lemelson |
| 5,883,437 A | 3/1999 | Maruyama et al. |
| 5,889,991 A | 3/1999 | Consolatti et al. |
| 5,901,313 A | 5/1999 | Wolf et al. |
| 5,903,455 A | 5/1999 | Sharpe, Jr. et al. |
| 5,910,011 A | 6/1999 | Cruse |
| 5,910,846 A | 6/1999 | Sandhu |
| 5,912,678 A | 6/1999 | Saxena et al. |
| 5,916,016 A | 6/1999 | Bothra |
| 5,923,553 A | 7/1999 | Yi |
| 5,926,690 A | 7/1999 | Toprac et al. |
| 5,930,138 A | 7/1999 | Lin et al. |
| 5,940,300 A | 8/1999 | Ozaki |
| 5,943,237 A | 8/1999 | Van Boxem |
| 5,943,550 A | 8/1999 | Fulford, Jr. et al. |
| 5,960,185 A | 9/1999 | Nguyen |
| 5,960,214 A | 9/1999 | Sharpe, Jr. et al. |
| 5,961,369 A | 10/1999 | Bartels et al. |
| 5,963,881 A | 10/1999 | Kahn et al. |
| 5,975,994 A | 11/1999 | Sandhu et al. |
| 5,978,751 A | 11/1999 | Pence et al. |
| 5,982,920 A | 11/1999 | Tobin, Jr. et al. |
| 6,002,989 A | 12/1999 | Shiba et al. |
| 6,012,048 A | 1/2000 | Gustin et al. |
| 6,017,771 A | 1/2000 | Yang et al. |
| 6,036,349 A | 3/2000 | Gombar |
| 6,037,664 A | 3/2000 | Zhao et al. |
| 6,041,263 A | 3/2000 | Boston et al. |
| 6,041,270 A | 3/2000 | Steffan et al. |
| 6,054,379 A | 4/2000 | Yau et al. |
| 6,059,636 A | 5/2000 | Inaba et al. |
| 6,064,759 A | 5/2000 | Buckley et al. |
| 6,072,313 A | 6/2000 | Li et al. |
| 6,074,443 A | 6/2000 | Venkatesh et al. |
| 6,077,412 A | 6/2000 | Ting et al. |
| 6,078,845 A | 6/2000 | Friedman |
| 6,094,688 A | 7/2000 | Mellen-Garnett et al. |
| 6,096,649 A | 8/2000 | Jang |
| 6,097,887 A | 8/2000 | Hardikar et al. |
| 6,100,195 A | 8/2000 | Chan et al. |
| 6,108,092 A | 8/2000 | Sandhu |
| 6,111,634 A | 8/2000 | Pecen et al. |
| 6,112,130 A | 8/2000 | Fukuda et al. |

| Patent | Type | Date | Inventor |
|---|---|---|---|
| 6,113,462 | A | 9/2000 | Yang |
| 6,114,238 | A | 9/2000 | Liao |
| 6,127,263 | A | 10/2000 | Parikh |
| 6,128,016 | A | 10/2000 | Coelho et al. |
| 6,136,163 | A | 10/2000 | Cheung et al. |
| 6,141,660 | A | 10/2000 | Bach et al. |
| 6,143,646 | A | 11/2000 | Wetzel |
| 6,148,099 | A | 11/2000 | Lee et al. |
| 6,148,239 | A | 11/2000 | Funk et al. |
| 6,148,246 | A | 11/2000 | Kawazome |
| 6,150,270 | A | 11/2000 | Matsuda et al. |
| 6,157,864 | A | 12/2000 | Schwenke et al. |
| 6,159,075 | A | 12/2000 | Zhang |
| 6,159,644 | A | 12/2000 | Satoh et al. |
| 6,161,054 | A | 12/2000 | Rosenthal et al. |
| 6,169,931 | B1 | 1/2001 | Runnels |
| 6,172,756 | B1 | 1/2001 | Chalmers et al. |
| 6,173,240 | B1 | 1/2001 | Sepulveda et al. |
| 6,175,777 | B1 | 1/2001 | Kim |
| 6,178,390 | B1 | 1/2001 | Jun |
| 6,181,013 | B1 | 1/2001 | Liu et al. |
| 6,183,345 | B1 | 2/2001 | Kamono et al. |
| 6,185,324 | B1 | 2/2001 | Ishihara et al. |
| 6,191,864 | B1 | 2/2001 | Sandhu |
| 6,192,291 | B1 | 2/2001 | Kwon |
| 6,197,604 | B1 | 3/2001 | Miller et al. |
| 6,204,165 | B1 | 3/2001 | Ghoshal |
| 6,210,983 | B1 | 4/2001 | Atchison et al. |
| 6,211,094 | B1 | 4/2001 | Jun et al. |
| 6,212,961 | B1 | 4/2001 | Dvir |
| 6,214,734 | B1 | 4/2001 | Bothra et al. |
| 6,217,412 | B1 | 4/2001 | Campbell et al. |
| 6,219,711 | B1 | 4/2001 | Chari |
| 6,222,936 | B1 | 4/2001 | Phan et al. |
| 6,226,563 | B1 | 5/2001 | Lim |
| 6,226,792 | B1 | 5/2001 | Goiffon et al. |
| 6,228,280 | B1 | 5/2001 | Li et al. |
| 6,230,069 | B1 | 5/2001 | Campbell et al. |
| 6,236,903 | B1 | 5/2001 | Kim et al. |
| 6,237,050 | B1 | 5/2001 | Kim et al. |
| 6,240,330 | B1 | 5/2001 | Kurtzberg et al. |
| 6,240,331 | B1 | 5/2001 | Yun |
| 6,245,581 | B1 | 6/2001 | Bonser et al. |
| 6,246,972 | B1 | 6/2001 | Klimasauskas |
| 6,248,602 | B1 | 6/2001 | Bode et al. |
| 6,249,712 | B1 | 6/2001 | Boiquaye |
| 6,252,412 | B1 | 6/2001 | Talbot et al. |
| 6,253,366 | B1 | 6/2001 | Mutschler, III |
| 6,259,160 | B1 | 7/2001 | Lopatin et al. |
| 6,263,255 | B1 | 7/2001 | Tan et al. |
| 6,268,270 | B1 | 7/2001 | Scheid et al. |
| 6,271,670 | B1 | 8/2001 | Caffey |
| 6,276,989 | B1 | 8/2001 | Campbell et al. |
| 6,277,014 | B1 | 8/2001 | Chen et al. |
| 6,278,899 | B1 | 8/2001 | Piche et al. |
| 6,280,289 | B1 | 8/2001 | Wiswesser et al. |
| 6,281,127 | B1 | 8/2001 | Shue |
| 6,284,622 | B1 | 9/2001 | Campbell et al. |
| 6,287,879 | B1 | 9/2001 | Gonzales et al. |
| 6,290,572 | B1 | 9/2001 | Hofmann |
| 6,291,367 | B1 | 9/2001 | Kelkar |
| 6,292,708 | B1 | 9/2001 | Allen et al. |
| 6,298,274 | B1 | 10/2001 | Inoue |
| 6,298,470 | B1 | 10/2001 | Breiner et al. |
| 6,303,395 | B1 | 10/2001 | Nulman |
| 6,304,999 | B1 | 10/2001 | Toprac et al. |
| 6,307,628 | B1 | 10/2001 | Lu et al. |
| 6,314,379 | B1 | 11/2001 | Hu et al. |
| 6,317,643 | B1 | 11/2001 | Dmochowski |
| 6,320,655 | B1 | 11/2001 | Matsushita et al. |
| 6,324,481 | B1 | 11/2001 | Atchison et al. |
| 6,334,807 | B1 | 1/2002 | Lebel et al. |
| 6,336,841 | B1 | 1/2002 | Chang |
| 6,339,727 | B1 | 1/2002 | Ladd |
| 6,340,602 | B1 | 1/2002 | Johnson et al. |
| 6,345,288 | B1 | 2/2002 | Reed et al. |
| 6,345,315 | B1 | 2/2002 | Mishra |
| 6,346,426 | B1 | 2/2002 | Toprac et al. |
| 6,355,559 | B1 | 3/2002 | Havemann et al. |
| 6,360,133 | B1 | 3/2002 | Campbell et al. |
| 6,360,184 | B1 | 3/2002 | Jacquez |
| 6,363,294 | B1 | 3/2002 | Coronel et al. |
| 6,366,934 | B1 | 4/2002 | Cheng et al. |
| 6,368,879 | B1 | 4/2002 | Toprac |
| 6,368,883 | B1 | 4/2002 | Bode et al. |
| 6,368,884 | B1 | 4/2002 | Goodwin et al. |
| 6,379,980 | B1 | 4/2002 | Toprac |
| 6,381,564 | B1 | 4/2002 | Davis et al. |
| 6,388,253 | B1 | 5/2002 | Su |
| 6,389,491 | B1 | 5/2002 | Jacobson et al. |
| 6,391,780 | B1 | 5/2002 | Shih et al. |
| 6,395,152 | B1 | 5/2002 | Wang |
| 6,397,114 | B1 | 5/2002 | Eryurek et al. |
| 6,400,162 | B1 | 6/2002 | Mallory et al. |
| 6,405,096 | B1 | 6/2002 | Toprac et al. |
| 6,405,144 | B1 | 6/2002 | Toprac et al. |
| 6,417,014 | B1 | 7/2002 | Lam et al. |
| 6,427,093 | B1 | 7/2002 | Toprac |
| 6,432,728 | B1 | 8/2002 | Tai et al. |
| 6,435,952 | B1 | 8/2002 | Boyd et al. |
| 6,438,438 | B1 | 8/2002 | Takagi et al. |
| 6,440,295 | B1 | 8/2002 | Wang |
| 6,442,496 | B1 | 8/2002 | Pasadyn et al. |
| 6,449,524 | B1 | 9/2002 | Miller et al. |
| 6,455,415 | B1 | 9/2002 | Lopatin et al. |
| 6,455,937 | B1 | 9/2002 | Cunningham |
| 6,465,263 | B1 | 10/2002 | Coss, Jr. et al. |
| 6,470,230 | B1 | 10/2002 | Toprac et al. |
| 6,479,902 | B1 | 11/2002 | Lopatin et al. |
| 6,479,990 | B2 | 11/2002 | Mednikov et al. |
| 6,482,660 | B2 | 11/2002 | Conchieri et al. |
| 6,484,064 | B1 | 11/2002 | Campbell |
| 6,486,492 | B1 | 11/2002 | Su |
| 6,492,281 | B1 | 12/2002 | Song et al. |
| 6,495,452 | B1 | 12/2002 | Shih |
| 6,503,839 | B2 | 1/2003 | Gonzales et al. |
| 6,515,368 | B1 | 2/2003 | Lopatin et al. |
| 6,517,413 | B1 | 2/2003 | Hu et al. |
| 6,517,414 | B1 | 2/2003 | Tobin et al. |
| 6,528,409 | B1 | 3/2003 | Lopatin et al. |
| 6,529,789 | B1 | 3/2003 | Campbell et al. |
| 6,532,555 | B1 | 3/2003 | Miller et al. |
| 6,535,783 | B1 | 3/2003 | Miller et al. |
| 6,537,912 | B1 | 3/2003 | Agarwal |
| 6,539,267 | B1 * | 3/2003 | Eryurek et al. ............... 700/51 |
| 6,540,591 | B1 | 4/2003 | Pasadyn et al. |
| 6,541,401 | B1 | 4/2003 | Herner et al. |
| 6,546,508 | B1 | 4/2003 | Sonderman et al. |
| 6,556,881 | B1 | 4/2003 | Miller |
| 6,560,504 | B1 | 5/2003 | Goodwin et al. |
| 6,563,308 | B2 | 5/2003 | Nagano et al. |
| 6,567,717 | B2 | 5/2003 | Krivokapic et al. |
| 6,580,958 | B1 | 6/2003 | Takano |
| 6,587,744 | B1 | 7/2003 | Stoddard et al. |
| 6,590,179 | B2 | 7/2003 | Tanaka et al. |
| 6,604,012 | B1 | 8/2003 | Cho et al. |
| 6,605,549 | B2 | 8/2003 | Leu et al. |
| 6,607,976 | B2 | 8/2003 | Chen et al. |
| 6,609,946 | B1 | 8/2003 | Tran |
| 6,616,513 | B1 | 9/2003 | Osterheld |
| 6,618,692 | B2 | 9/2003 | Takahashi et al. |
| 6,624,075 | B1 | 9/2003 | Lopatin et al. |

| | | | | | |
|---|---|---|---|---|---|
| 6,625,497 B2 | 9/2003 | Fairbairn et al. | GB | 2 365 215 A | 2/2002 |
| 6,630,741 B1 | 10/2003 | Lopatin et al. | JP | 61-66104 | 4/1986 |
| 6,640,151 B1 | 10/2003 | Somekh et al. | JP | 61-171147 | 8/1986 |
| 6,652,355 B2 | 11/2003 | Wiswesser et al. | JP | 01-283934 | 11/1989 |
| 6,660,633 B1 | 12/2003 | Lopatin et al. | JP | 3-202710 | 9/1991 |
| 6,678,570 B1 | 1/2004 | Pasadyn et al. | JP | 05-151231 | 6/1993 |
| 6,684,114 B1 * | 1/2004 | Erickson et al. ............... 700/45 | JP | 05-216896 | 8/1993 |
| 6,708,074 B1 | 3/2004 | Chi et al. | JP | 05-266029 | 10/1993 |
| 6,708,075 B2 | 3/2004 | Sonderman et al. | JP | 06-110894 | 4/1994 |
| 6,725,402 B1 | 4/2004 | Coss, Jr. et al. | JP | 06-176994 | 6/1994 |
| 6,728,587 B2 | 4/2004 | Goldman et al. | JP | 06-184434 | 7/1994 |
| 6,735,492 B2 | 5/2004 | Conrad et al. | JP | 06-252236 | 9/1994 |
| 6,748,280 B1 * | 6/2004 | Zou et al. ..................... 700/31 | JP | 06-260380 | 9/1994 |
| 6,751,518 B1 | 6/2004 | Sonderman et al. | JP | 8-23166 | 1/1996 |
| 6,766,214 B1 * | 7/2004 | Wang et al. ................ 700/121 | JP | 08-50161 | 2/1996 |
| 6,774,998 B1 | 8/2004 | Wright et al. | JP | 08-149583 | 6/1996 |
| 2001/0001755 A1 | 5/2001 | Sandhu et al. | JP | 08-304023 | 11/1996 |
| 2001/0003084 A1 | 6/2001 | Finarov | JP | 09-34535 | 2/1997 |
| 2001/0006873 A1 | 7/2001 | Moore | JP | 9-246547 | 9/1997 |
| 2001/0030366 A1 | 10/2001 | Nakano et al. | JP | 10-34522 | 2/1998 |
| 2001/0039462 A1 | 11/2001 | Mendez et al. | JP | 10-173029 | 6/1998 |
| 2001/0040997 A1 | 11/2001 | Tsap et al. | JP | 11-67853 | 3/1999 |
| 2001/0042690 A1 | 11/2001 | Talieh | JP | 11-126816 | 5/1999 |
| 2001/0044667 A1 | 11/2001 | Nakano et al. | JP | 11-135601 | 5/1999 |
| 2002/0032499 A1 | 3/2002 | Wilson et al. | JP | 2000-183001 | 6/2000 |
| 2002/0058460 A1 | 5/2002 | Lee et al. | JP | 2001-76982 | 3/2001 |
| 2002/0070126 A1 | 6/2002 | Sato et al. | JP | 2001-284299 | 10/2001 |
| 2002/0077031 A1 | 6/2002 | Johannson et al. | JP | 2001-305108 | 10/2001 |
| 2002/0081951 A1 | 6/2002 | Boyd et al. | JP | 2002-9030 | 1/2002 |
| 2002/0089676 A1 | 7/2002 | Pecan et al. | JP | 2002-343754 | 11/2002 |
| 2002/0102853 A1 | 8/2002 | Li et al. | TW | 434103 | 5/2001 |
| 2002/0107599 A1 | 8/2002 | Patel et al. | TW | 436383 B | 5/2001 |
| 2002/0107604 A1 | 8/2002 | Riley et al. | TW | 455938 B | 9/2001 |
| 2002/0113039 A1 | 8/2002 | Mok et al. | TW | 455976 | 9/2001 |
| 2002/0127950 A1 | 9/2002 | Hirose et al. | WO | WO 95/34866 | 12/1995 |
| 2002/0128805 A1 | 9/2002 | Goldman et al. | WO | WO 98/05066 | 2/1998 |
| 2002/0149359 A1 | 10/2002 | Crouzen et al. | WO | WO 98/45090 | 10/1998 |
| 2002/0165636 A1 | 11/2002 | Hasan | WO | WO 99/09371 | 2/1999 |
| 2002/0183986 A1 | 12/2002 | Stewart et al. | WO | WO 99/25520 | 5/1999 |
| 2002/0185658 A1 | 12/2002 | Inoue et al. | WO | WO 99/59200 | 11/1999 |
| 2002/0193899 A1 | 12/2002 | Shanmugasundram et al. | WO | WO 00/00874 | 1/2000 |
| 2002/0193902 A1 | 12/2002 | Shanmugasundram et al. | WO | WO 00/05759 | 2/2000 |
| 2002/0197745 A1 | 12/2002 | Shanmugasundram et al. | WO | WO 00/35063 | 6/2000 |
| 2002/0197934 A1 | 12/2002 | Paik | WO | WO 00/54325 | 9/2000 |
| 2002/0199082 A1 | 12/2002 | Shanmugasundram et al. | WO | WO 00/79355 A1 | 12/2000 |
| 2003/0017256 A1 | 1/2003 | Shimane | WO | WO 01/11679 A1 | 2/2001 |
| 2003/0020909 A1 | 1/2003 | Adams et al. | WO | WO 01/15865 A1 | 3/2001 |
| 2003/0020928 A1 | 1/2003 | Ritzdorf et al. | WO | WO 01/18623 A1 | 3/2001 |
| 2003/0154062 A1 | 8/2003 | Daft et al. | WO | WO 01/25865 A1 | 4/2001 |
| 2004/0073319 A1 * | 4/2004 | Monari ........................ 700/14 | WO | WO 01/33277 A1 | 5/2001 |
| | | | WO | WO 01/33501 A1 | 5/2001 |
| | FOREIGN PATENT DOCUMENTS | | WO | WO 01/52055 A3 | 7/2001 |
| | | | WO | WO 01/52319 A1 | 7/2001 |
| CA | 2194855 | 8/1991 | WO | WO 01/57823 A2 | 8/2001 |
| EP | 0 397 924 A1 | 11/1990 | WO | WO 01/80306 A2 | 10/2001 |
| EP | 0 621 522 A2 | 10/1994 | WO | WO 02/17150 A1 | 2/2002 |
| EP | 0 747 795 A2 | 12/1996 | WO | WO 02/31613 A2 | 4/2002 |
| EP | 0 869 652 A2 | 10/1998 | WO | WO 02/31613 A3 | 4/2002 |
| EP | 0 877 308 A2 | 11/1998 | WO | WO 02/33737 A2 | 4/2002 |
| EP | 0 881 040 A2 | 12/1998 | WO | WO 02/074491 A1 | 9/2002 |
| EP | 0 895 145 A1 | 2/1999 | | | |
| EP | 0 910 123 A1 | 4/1999 | | OTHER PUBLICATIONS | |
| EP | 0 932 194 A1 | 7/1999 | | | |
| EP | 0 932 195 A1 | 7/1999 | | | |
| EP | 1 066 925 A2 | 1/2001 | | | |
| EP | 1 067 757 A1 | 1/2001 | | | |
| EP | 1 071 128 A2 | 1/2001 | | | |
| EP | 1 083 470 A2 | 3/2001 | | | |
| EP | 1 092 505 A2 | 4/2001 | | | |
| EP | 1 072 967 A3 | 11/2001 | | | |
| EP | 1 182 526 A2 | 2/2002 | | | |
| GB | 2 347 885 A | 9/2000 | | | |

Sep. 29, 2004. Office Action for U.S. Appl. No. 09/363,966, filed Jul. 29, 1999.

Oct. 1, 2004. International Preliminary Examination Report for PCT Serial No. PCT/US03/23964.

Oct. 6, 2004. Office Action for U.S. Appl. No. 10/759,108, filed Jan. 20, 2004.

Oct. 12, 2004. International Preliminary Examination Report for PCT Serial No. PCT/US02/19061.

Nov. 17, 2004. Written Opinion for PCT Serial No. PCT/US01/27407.

IslamRaja, M. M., C. Chang, J. P. McVittie, M. A. Cappelli, and K. C. Saraswat. May/Jun. 1993. "Two Precursor Model for Low–Pressure Chemical Vapor Deposition of Silicon Dioxide from Tetraethylorthosilicate." *J. Vac. Sci. Technol. B*, vol. 11, No. 3, pp. 720–726.

Kim, Eui Jung and William N. Gill. Jul. 1994. "Analytical Model for Chemical Vapor Deposition of $SiO_2$ Films Using Tetraethoxysliane and Ozone" (Abstract). *Journal of Crystal Growth*, vol. 140, Issues 3–4, pp. 315–326.

Guo, R.S, A. Chen, C.L. Tseng, I.K. Fong, A. Yang, C.L. Lee, C.H. Wu, S. Lin, S.J. Huang, Y.C. Lee, S.G. Chang, and M.Y. Lee. Jun. 16–17, 1998. "A Real–Time Equipment Monitoring and Fault Detection System." *Semiconductor Manufacturing Technology Workshop*, pp. 111–121.

Lantz, Mikkel. 1999. "Equipment and APC Integration at AMD with Workstream." *IEEE*, pp. 325–327.

Jul. 15, 2004. Office Action for U.S. App. No. 10/172,977, filed Jun. 18, 2002.

Aug. 2, 2004. Office Action for U.S. Appl. No. 10/174,377, filed Jun. 18, 2002.

Aug. 9, 2004. Written Opinion for PCT Serial No. PCT/US02/19063.

Aug. 18, 2004. International Preliminary Examination Report for PCT Serial No. PCT/US02/19116.

Aug. 24, 2004. Office Action for U.S. Serial No. 10/135,405, filed May 1, 2002.

Aug. 25, 2004. Office Action for U.S. Serial No. 09/998,384, filed Nov. 30, 2001.

Sep. 9, 2004. Written Opinion for PCT Serial No. PCT/US02/21942.

Sep. 16, 2004. International Preliminary Examination Report for PCT Serial No. PCT/US02/24859.

Lin, Kuang–Kuo and Costas J. Spanos. Nov. 1990. "Statistical Equipment Modeling for VLSI Manufacturing: An Application for LPCVD." *IEEE Transactions on Semiconductor Manufacturing*, v. 3, n. 4, pp. 216–229.

Spanos, Costas J., Hai–Fang Guo, Alan Miller, and Joanne Levine–Parrill. Nov. 1992. "Real–Time Statistical Process Control Using Tool Data." *IEEE Transactions on Semiconductor Manufacturing*, v. 5, n. 4, pp. 308–318.

Kurtzberg, Jerome M. and Menachem Levanoni. Jan. 1994. "ABC: A Better Control for Manufacturing." *IBM Journal of Research and Development*, v. 38, n. 1, pp. 11–30.

Mozumder, Purnendu K. and Gabriel G. Barna. Feb. 1994. "Statistical Feedback Control of a Plasma Etch Process." *IEEE Transactions on Semiconductor Manufacturing*, v. 7, n. 1, pp. 1–11.

Edgar, Thomas F., Stephanie W. Butler, W. Jarrett Campbell, Carlos Pfeiffer, Christopher Bode, Sung Bo Hwang, K. S. Balakrishnan, and J. Hahn. Nov. 2000. "Automatic Control in Microelectronics Manufacturing: Practices, Challenges, and Possibilities (Abstract)." *Automatica*, v. 36, n. 11.

U.S. Appl. No. 09/363,966 filed Jul. 29, 1999 Arackaparambil et al. Computer Integrated Manufacturing Techniques.

U.S. Appl. No. 09/469,227 filed Dec. 22, 1999 Somekh et al. Multi–Tool Control System, Method and Medium.

U.S. Appl. No. 09/619,044 filed Jul. 19, 2000 Yuan System and Method of Exporting or Importing Object Data in a Manufacturing Execution System.

U.S. Appl. No. 09/637,620 filed Aug. 11, 2000 Chi et al. Generic Interface Builder.

U.S. Appl. No. 09/656,031 filed Sep. 6, 2000 Chi et al. Dispatching Component for Associating Manufacturing Facility Service Requestors with Service Providers.

U.S. Appl. No. 09/655,542 filed Sep. 6, 2000 Yuan System, Method and Medium for Defining Palettes to Transform an Application Program Interface for a Service.

U.S. Appl. No. 09/725,908 filed Nov. 30, 2000 Chi et al. Dynamic Subject Information Generation in Message Services of Distributed Object Systems.

U.S. Appl. No. 09/800,980 filed Mar. 8, 2001 Hawkins et al. Dynamic and Extensible Task Guide.

U.S. Appl. No. 09/811,667 filed Mar. 20, 2001 Yuan et al. Fault Tolerant and Automated Computer Software Workflow.

U.S. Appl. No. 09/927,444 filed Aug. 13, 2001 Ward et al. Dynamic Control of Wafer Processing Paths in Semiconductor Manufacturing Processes.

U.S. Appl. No. 09/928,473 filed Aug. 14, 2001 Koh Tool Services Layer for Providing Tool Service Functions in Conjunction with Tool Functions.

U.S. Appl. No. 09/928,474 filed Aug. 14, 2001 Krishnamurthy et al. Experiment Management System, Method and Medium.

U.S. Appl. No. 09/943,383 filed Aug. 31, 2001 Shanmugasundram et al. In Situ Sensor Based Control of Semiconductor Processing Procedure.

U.S. Appl. No. 09/943,955 filed Aug. 31, 2001 Shanmugasundram et al. Feedback Control of a Chemical Mechanical Polishing Device Providing Manipulation of Removal Rate Profiles.

U.S. Appl. No. 09/998,372 filed Nov. 30, 2001 Paik Control of Chemical Mechanical Polishing Pad Conditioner Directional Velocity to Improve Pad Life.

U.S. Appl. No. 09/998,384 filed Nov. 30, 2001 Paik Feedforward and Feedback Control for Conditioning of Chemical Mechanical Polishing Pad.

U.S. Appl. No. 10/084,092 filed Feb. 28, 2002 Arackaparambil et al. Computer Integrated Manufacturing Techniques.

U.S. Appl. No. 10/100,184 filed Mar. 19, 2002 Al–Bayati et al. Method, System and Medium for Controlling Semiconductor Wafer Processes Using Critical Dimension Measurements.

U.S. Appl. No. 10/135,405 filed May 1, 2002 Reiss et al. Integration of Fault Detection with Run–to–Run Control.

U.S. Appl. No. 10/135,451 filed May 1, 2002 Shanmugasundram et al. Dynamic Metrology Schemes and Sampling Schemes for Advanced Process Control in Semiconductor Processing.

U.S. Appl. No. 10/172,977 filed Jun. 18, 2002 Shanmugasundram et al. Method, System and Medium for Process Control for the Matching of Tools, Chambers and/or Other Semiconductor–Related Entities.

U.S. Appl. No. 10/173,108 filed Jun. 18, 2002 Shanmugasundram et al. Integrating Tool, Module, and Fab Level Control.

U.S. Appl. No. 10/174,370 filed Jun. 18, 2002 Shanmugasundram et al. Feedback Control of Plasma–Enhanced Chemical Vapor Deposition Processes.

U.S. Appl. No. 10/174,377 filed Jun. 18, 2002 Schwarm et al. Feedback Control of Sub–Atmospheric Chemical Vapor Deposition Processes.

U.S. Appl. No. 10/377,654 filed Mar. 4, 2003 Kokotov et al. Method, System and Medium for Controlling Manufacturing Process Using Adaptive Models Based on Empirical Data.

U.S. Appl. No. 10/393,531 filed Mar. 21, 2003 Shanmugasundram et al. Copper Wiring Module Control.

U.S. Appl. No. 10/632,107 filed Aug. 1, 2003 Schwarm et al. Method, System, and Medium for Handling Misrepresentative Metrology Data Within an Advanced Process Control System.

U.S. Appl. No. 10/665,165 filed Sep. 18, 2003 Paik Feedback Control of a Chemical Mechanical Polishing Process for Multi-Layered Films.

U.S. Appl. No. 10/712,273 filed Nov. 14, 2003 Kokotov Method, System and Medium for Controlling Manufacture Process Having Multivariate Input Parameters.

U.S. Appl. No. 10/759,108 filed Jan. 20, 2004 Schwarm Automated Design and Execution of Experiments with Integrated Model Creation for Semiconductor Manufacturing Tools.

U.S. Appl. No. 10/765,921 filed Jan. 29, 2004 Schwarm System, Method, and Medium for Monitoring Performance of an Advanced Process Control System.

U.S. Appl. No. 10/809,906 filed Mar. 26, 2004 Surana et al. A Technique for Process-Qualifying a Semiconductor Manufacturing Tool Using Metrology Data.

U.S. Appl. No. 10/809,908 filed Mar. 26, 2004 Yang et al. Improved Control of Metal Resistance in Semiconductor Products via Integrated Metrology.

U.S. Appl. No. 10/812,480 filed Mar. 30, 2004 Padhi et al. Selective Metal Encapsulation Schemes.

U.S. Appl. No. 10/856,016 filed May 28, 2004 Paik Improved Process Control by Distinguishing a White Noise Component of a Process Variance.

Miller, G. L., D. A. H. Robinson, and J. D. Wiley. Jul. 1976. "Contactless measurement of semiconductor conductivity by radio frequency-free-carrier power absorption." *Rev. Sci. Instrum.*, vol. 47, No. 7. pp. 799–805.

Ostanin, Yu.Ya. Oct. 1981. "Optimization of Thickness Inspection of Electrically Conductive Single-Layer Coatings with Laid-on Eddy-Current Transducers (Abstract)." *Defektoskopiya*, vol. 17, No. 10, pp. 45–52. Moscow, USSR.

Feb. 1984. "Method and Apparatus of in Situ Measurement and Overlay Error Analysis for Correcting Step and Repeat Lithographic Cameras." *IBM Technical Disclosure Bulletin*, pp. 4855–4859.

Feb. 1984. "Substrate Screening Process." *IBM Technical Disclosure Bulletin*, pp. 4824–4825.

Oct. 1984. "Method to Characterize the Stability of a Step and Repeat Lighographic System." *IBM Technical Disclosure Bulletin*, pp. 2857–2860.

Levine, Martin D. 1985. *Vision in Man and Machine*. New York: McGraw-Hill, Inc. pp. ix–xii, 1–58.

Herrmann, D. 1988. "Temperature Errors and Ways of Elimination for Contactless Measurement of Shaft Vibrations (Abstract)." *Technisches Messen™*, vol. 55, No. 1, pp. 27–30. West Germany.

Runyan, W. R., and K. E. Bean. 1990. "Semiconductor Integrated Circuit Processing Technology." p. 48. Reading, Massachusetts: Addison-Wesley Publishing Company.

Chang, Norman H. and Costas J. Spanos. Feb. 1991. "Continuous Equipment Diagnosis Using Evidence Integration: An LPCVD Application." *IEEE Transactions on Semiconductor Manufacturing*, v. 4, n. 1, pp. 43–51.

Larrabee, G. B. May 1991. "The Intelligent Microelectronics Factory of the Future (Abstract)." *IEEE/SEMI International Semiconductor Manufacturing Science Symposium*, pp. 30–34. Burlingame, CA.

Burke, Peter A. Jun. 1991. "Semi-Empirical Modelling of SiO2 Chemical-Mechanical Polishing Planarization." *VMIC Conference, 1991 IEEE*, pp. 379–384. IEEE.

Zorich, Robert. 1991. *Handbook of Quality Integrated Circuit Manufacturing.* pp. 464–498 San Diego, California: Academic Press, Inc.

Rampalli, Prasad, Arakere Ramesh, and Nimish Shah. 1991. *CEPT—A Computer-Aided Manufacturing Application for Managing Equipment Reliability and Availability in the Semiconductor Industry*. New York, New York: IEEE.

May 1992. "Lawer Ablation Endpoint Detector." *IBM Technical Disclosure Bulletin*, pp. 333–334.

Feb. 1993. "Electroless Plating Scheme to Hermetically Seal Copper Features." *IBM Technical Disclosure Bulletin*. pp. 405–406.

Scarr, J. M. and J. K. Zelisse. Apr. 1993. "New Topology for Thickness Monitoring Eddy Current Sensors (Abstract)." *Proceedings of the 36$^{th}$ Annual Technical Conference*, Dallas, Texas.

Hu, Albert, Kevin Nguyen, Steve Wong, Xiuhua Zhang, Emanuel Sachs, and Peter Renteln. 1993. "Concurrent Deployment of Run by Run Controller Using SCC Framework." IEEE/SEMI International Semiconductor Manufacturing Science Symposium. pp. 126–132.

Matsuyama, Akira and Jessi Niou. 1993. "A State-of-the-Art Automation System of an ASIC Wafer Fab in Japan." *IEEE/SEMI International Semiconductor Manufacturing Science Symposium*, pp. 42–47.

Yeh, C. Eugene, John C. Cheng, and Kwan Wong. 1993. "Implementation Challenges of a Feedback Control System for Wafer Fabrication." *IEEE/CHMT International Electronics Manufacturing Technology Symposium*, pp. 438–442.

Muller-Heinzerling, Thomas, Ulrich Neu, Hans Georg Nurnberg, and Wolfgang May. Mar. 1994. "Recipe-Controlled Operation of Batch Processes with Batch X." *ATP Automatisierungstechnische Praxis*, vol. 36, No. 3, pp. 43–51.

Stoddard, K., P. Crouch, M. Kozicki, and K. Taskalis, Jun.–Jul. 1994. "Application of Feedforward and Adaptive Feedback Control to Semiconductor Device Manufacturing (Abstract)." *Proceedings of 1994 American Control Conference—ACC '94*, vol. 1, pp. 892–896. Baltimore, Maryland.

Rocha, Joao and Carlow Ramos. Sep. 12, 1994. "Task Planning for Flexible and Agile Manufacturing Systems." *Intelligent Robots and Systems '94. Advanced Robotic Systems and the Real World, IROS '94. Proceedings of the IEEE/RSJ/GI International Conference on Munich*, Germany Sep. 12–16, 1994. New York, New York: IEEE. pp. 105–112.

Schaper, C. D., M. M. Moslehi, K. C. Saraswat, and T. Kailath. Nov. 1994. "Modeling, Identification, and Control of Rapid Thermal Processing Systems (Abstract)." *Journal of the Electrochemical Society*, vol. 141, No. 11, pp. 3200–3209.

Tao, K. M., R. L. Kosut, M. Ekblad, and G. Aral. Dec. 1994. "Feedforward Learning Applied to RTP of Semiconductor Wafers (Abstract)." *Proceedings of the 33$^{rd}$ IEEE Conference on Decision and Control*, vol. 1, pp. 67–72. Lake Buena Vista, Florida.

Hu, Albert, He Du, Steve Wong, Peter Rentein, and Emmanual Sachs. 1994. "Application of Run by Run Controller to the Chemical–Mechanical Planarization Process." *IEEE/CPMT International Electronics Manufacturing Technology Symposium*, pp. 371–378.

Spanos, C. J., S. Leang, S.-Y. Ma, J. Thomson, B. Bombay, and X. Niu. May 1995. "A Multistep Supervisory Controller for Photolithographic Operations (Abstract)." *Proceedings of the Symposium on Process Control, Diagnostics, and Modeling in Semiconductor Manufacturing*, pp. 3–17.

Moyne, James, Roland Telfeyan, Arnon Hurwitz, and John Taylor. Aug. 1995. "A Process–Independent Run–to–Run Controller and Its Application to Chemical–Mechanical Planarization." *SEMI/IEEE Advanced Semiconductor Manufacturing Conference and Workshop*. Ann Arbor, Michigan: The University of Michigan, Electrical Engineering & Computer Science Center for Display Technology & Manufacturing.

Zhou, Zhen–Hong and Rafael Reif. Aug. 1995. "Epi–Film Thickness Measurements Using Emission Fourier Transform Infrared Spectroscopy—Part II: Real–Time in Situ Process Monitoring and Control." IEEE Transactions on Semiconductor Manufacturing, vol. 8, No. 3.

Telfeyan, Roland, James Moyne, Nauman Chaudhry, James Pugmire, Scott Shellman, Duane Boning, William Moyne, Arnon Hurwitz, and John Taylor. Oct. 1995. "A Multi–Level Approach to the Control of a Chemical–Mechanical Planarization Process." Minneapolis, Minnesota: $42^{nd}$ National Symposium of the American Vacuum Society.

Chang, E., B. Stine, T. Maung, R. Divecha, D. Boning, J. Chung, K. Chang, G. Ray, D. Bradbury, O. S. Nakagawa, S. Oh, and D. Bartelink. Dec. 1995. "Using a Statistical Metrology Framework to Identify Systemic and Random Sources of Die– and Wafer–level ILD Thickness Variation in CMP Processes." Washington, D.C.: International Electron Devices Meeting.

Moyne, James R., Nauman Chaudhry, and Roland Telfeyan. 1995. "Adaptive Extensions to a Multi–Branch Run–to–Run Controller for Plasma Etching." *Journal of Vacuum Science and Technology*. Ann Arbor, Michigan: University of Michigan Display Technology Manufacturing Center.

Schmid, Hans Albrecht. 1995. "Creating the Architecture of a Manufacturing Framework by Design Patterns." Austin, Texas: OOPSLA.

Dishon, G., M. Finarov, R. Kipper, J.W. Curry, T. Schraub, D. Trojan, $4^{th}$ Stambaugh, Y. Li and J. Ben–Jacob. Feb. 1996. "On–Line Integrated Metrology for CMP Processing." Santa Clara, California: VMIC Speciality Conferences, $1^{st}$ International CMP Planarization Conference.

Leang, Sovarong, Shang–Yi Ma, John Thomson, Bart John Bombay, and Costas J. Spanos. May 1996. "A Control System for Photolighographic Sequences." *IEEE Transactions on Semiconductor Manufacturing*, vol. 9, No. 2.

Smith, Taber, Duane Bonig, James Moyne, Arnon Hurwitz, and John Curry. Jun. 1996. "Compensating for CMP Pad Wear Using Run by Run Feedback, Control." Santa Clara, California: Proceedings of the Thirteenth International VLSI Multilevel Interconnection Conference. pp. 437–439.

Boning, Duane S., William P. Moyne, Taber H. Smith, James Moyne, Ronald Telfeyan, Arnon Hurwitz, Scott Shellman, and John Taylor. Oct. 1996. "Run by Run Control of Chemical–Mechanical Polishing." *IEEE Transactions and Components, Packaging, and Manufacturing Technology—Part C*, vol. 19, No. 4, pp. 307–314.

Zhe, Ning, J. R. Moyne, T. Smith, D. Boning, E. Del Castillo, Yeh Jinn–Yi, and Hurwitz. Nov. 1996. "A Comparative Analysis of Run–to–Run Control Algorithms in Semiconductor Manufacturing Industry (Abstract)." *IEEE/SEMI 1996 Advanced Semiconductor Manufacturing Conference Workshop*, pp. 375–381.

Yasuda, M., T. Osaka, and M. Ikeda. Dec. 1996. "Feedforward Control of a Vibration Isolation System for Disturbance Suppression (Abstract)." *Proceeding of the $35^{th}$IEEE Conference on Decision and Control*, vol. 2, pp. 1229–1233. Kobe, Japan.

Fan, Jr–Min, Ruey–Shan Guo, Shi–Chung Chang, and Kian–Huei Lee. 1996. "Abnormal Trend Detection of Sequence–Disordered Data Using EWMA Method." *IEEE/SEMI Advanced Semiconductor Manufacturing Conference*, pp. 169–174.

SEMI. [1986] 1996. "Standard for Definition and Measurement of Equipment Reliability, Availability, and Mantainability (RAM)." SEMI E10–96.

Smith, Taber and Duane Boning. 1996. "A Self–Tuning EWMA Controller Utilizing Artificial Neural Network Function Approximation Techniques." *IEEE/CPMT International Electronics Manufacturing Technology Symposium*, pp. 355–363.

Guo, Ruey–Shan, Li–Shia Huang, Argon Chen, and JinJung Chen. Oct. 1997. "A Cost–Effective Methodology for a Run–by–Run EWMA Controller." *$6^{th}$International Symposium on Semiconductor Manufacturing*, pp. 61–64.

Mullins, J. A., W. J. Campbell, and A. D. Stock. Oct. 1997. "An Evaluation of Model Predictive Control in Run–to–Run Processing in Semiconductor Manufacturing (Abstract)." *Proceedings of the SPIE—The International Society for Optical Engineering Conference*, vol. 3213, pp. 182–189.

Reitman, E. A., D. J. Friedman, and E. R. Lory. Nov. 1997. "Pre–Production Results Demonstrating Multiple–System Models for Yield Analysis (Abstract)." *IEEE Transactions on Semiconductor Manufacturing*, vol. 10, No. 4, pp. 469–481.

Durham, Jim and Myriam Roussel. 1997. "A Statistical Method for Correlating In–Line Defectivity to Probe Yield." *IEEE/SEMI Advanced Semiconductor Manufacturing Conference*, pp. 76–77.

Shindo, Wataru, Eric H. Wang, Ram Akella, and Andrzej J. Strojwas. 1997. "Excursion Detection and Source Isolation in Defect Inspection and Classification." *$2^{nd}$International Workshop on Statistical Metrology*, pp. 90–93.

Van Zant, Peter. 1997. *Microchip Fabrication: A Practical Guide to Semiconductor Processing*. Third Edition, pp. 472–478. New York, New York: McGraw–Hill.

Campbell, W. Jarrett, and Anthony J. Toprac. Feb. 11–12, 1998. "Run–to–Run Control in Microelectronics Manufacturing." Advanced Micro Devises, TWMCC.

Edgar, Thomas F., Stephanie W. Butler, Jarrett Campbell, Carlos Pfieffer, Chris Bode, Sung Bo Hwang, and K.S. Balakrishnan. May 1998. "Automatic Control in Microelectronics Manufacturing: Practices, Challenges, and Possibilities." Automatica, vol. 36, pp. 1567–1603, 2000.

Moyne, James, and John Curry. Jun. 1998. "A Fully Automated Chemical–Mechanical Planarization Process." Santa Clara, California: VLSI Multilevel Interconnection (V–MIC) Conference.

Jul. 1998. "Active Controller: Utilizing Active Databases for Implementing Multistop Control of Semiconductor Manufacturing (Abstract)." *IEEE Transactions on Components, Packaging and Manufacturing Technology—Part C*, vol. 21, No. 3, pp. 217–224.

SEMI. Jul. 1998. *New Standard: Provisional Specification for CIM Framework Domain Architecture*. Mountain View, California: SEMI Standards. SEMI Draft Doc. 2817.

Consilium. Aug. 1998. *Quality Management Component: QMC™ and QMC–Link™ Overview*. Mountain View, California: Consilium, Inc.

Chemali, Chai El, James Moyne, Kareemullah Khan, Rock Nadeau, Paul Smith, John Colt, Jonathan Chapple–Sokol, and Tarum Parikh. Nov. 1998. "Multizone Uniformity Control of a CMP Process Utilizing a Pre and Post–Measurement Strategy." Seattle, Washington: SEMETECH Symposium.

Consilium. 1998. *FAB300™*. Mountain View, California: Consilium, Inc.

Fang, S. J., A. Barda, T. Janecko, W. Little, D. Outley, G. Hempel, S. Joshi, B. Morrison, G. B. Shinn, and M. Birang. 1998. "Control of Dielectric Chemical Mechanical Polishing (CMP) Using and Interferometry Based Endpoint Sensor." *International Proceedings of the IEEE Interconnect Technology Conference*, pp. 76–78.

Khan, Kareemullah, Victor Solakhain, Anthony Ricci, Tier Gu, and James Moyne. 1998. "Run–to–Run Control of ITO Deposition Process." Ann Arbor, Michigan.

Ouma, Dennis, Duane Boning, James Chung, Greg Shinn, Leif Olsen, and John Clark. 1998. "An Integrated Characterization and Modeling Methodology for CMP Dielectric Planarization." *Proceedings of the IEEE 1998 International Interconnect Technology Conference*, pp. 67–69.

Sun, S.C. 1998. "CVD and PVD Transition Metal Nitrides as Diffusion Barriers for Cu Metallization." *IEEE*. pp. 243–246.

Suzuki, Junichi and Yoshikazu Yamamoto. 1998. "Toward the Interoperable Software Design Models: Quartet of UML, XML, DOM and CORBA." Proceedings IEEE International Software Engineering Standards Symposium. pp. 1–10.

Consilium. Jan. 1999. "FAB300™: Consilium's Next Generation MES Solution of Software and Services which Control and Automate Real–Time FAB Operations." www.consilium.com/products/fab300_page.htm#FAB300 Introduction.

Boning, Duane S., Jerry Stefani, and Stephanie W. Butler. Feb. 1999. "Statistical Methods for Semiconductor Manufacturing." *Encyclopedia of Electrical Engineering*, J. G. Webster, Ed.

McIntosh, John. Mar. 1999. "Using CD–SEM Metrology in the Manufacture of Semiconductors (Abstract)." *JOM*, vol. 51, No. 3, pp. 38–39.

Pan, J. Tony, Ping Li, Kapila Wijekoon, Stan Tsai, and Fritz Redeker. May 1999. "Copper CMP Integration and Time Dependent Pattern Effect." *IEEE 1999 International Interconnect Technology Conference*, pp. 164–166.

Klein, Bruce. Jun. 1999. "Application Development: XML Makes Object Models More Useful." Informationweek. pp. 1A–6A.

Baliga, John. Jul. 1999. "Advanced Process Control: Soon to be a Must." Cahners Semiconductor International. www.semiconductor.net/semiconductor/issues/issues/1999/jul99/docs/feature1.asp.

Consilium. Jul. 1999. "Increasing Overall Equipment Effectiveness (OEE) in Fab Manufacturing by Implementing Consilium's Next–Generating Manufacturing Execution System—MES II." Semiconductor Fabtech Edition 10.

Meckl, P.H. and K. Umemoto. Aug. 1999. "Achieving Fast Motions in Semiconductor Manufacturing Machinery (Abstract)." *Proceedings of the 1999 IEEE International Conference on Control Applications*, vol. 1, pp. 725–729, Kohala Coast, HI.

Consilium Corporate Brochure. Oct. 1999. www.consilium.com.

Khan, K., C. El Chemali, J. Moyne, J. Chapple–Sokol, R. Nadeau, P. Smith, C., and T. Parikh. Oct. 1999. "Yield Improvement at the Contact Process Through Run–to–Run Control (Abstract)." *24$^{th}$IEEE/CPMT Electronics Manufacturing Technology Symposium*, pp. 258–263.

Moyne, James. Oct. 1999. "Advancements in CMP Process Automation and Control." Hawaii: (Invited paper and presentation to) Third International Symposium on Chemical Mechanical Polishing in IC Device Manufacturing: 196$^{th}$ Meeting of the Electrochemical Society.

Williams, Randy, Dadi Gudmundsson, Kevin Monahan, Raman Nurani, Meryl Stroller and J. George Shanthikumar. Oct. 1999. "Optimized Sample Planning for Wafer Defect Inspection," *Semiconductor Manufacturing Conference Proceedings, 1999 IEEE International Symposium on Santa Clara, CA*. Piscataway, NJ. pp. 43–46.

Consilium. Nov. 1999. *FAB300™Update*.

Ruegsegger, Steven, Aaron Wagner, James S. Freudenberg, and Dennis S. Grimard. Nov. 1999. "Feedforward Control for Reduced Run–to–Run Variation in Microelectronics Manufacturing." *IEEE Transactions on Semiconductor Manufacturing*, vol. 12, No. 4.

1999. "Contactless Bulk Resistivity/Sheet Resistance Measurement and Mapping Systems." www.Lehighton.com/fattechl/index.html.

Nov. 1999. "How to Use EWMA to Achieve SPC and EPC Control." *International Symposium on NDT Contribution to the Infrastructure Safety Systems*, Tores, Brazil. <http://www.ndt.net/abstract/ndtiss99/data/35.htm>.

Edgar, T. F., W. J. Campbell, and C. Bode. Dec. 1999. "Model–Based Control in Microelectronics Manufacturing." *Proceedings of the 38$^{th}$IEEE Conference on Decision and Control*, Pheonix, Arizona, vol. 4, pp. 4185–4191.

Tagami, M., A. Furuya, T. Onodera, and Y. Hayashi. 1999. "Layered Ta–nitrides (LTN) Barrier Film by Power Swing Sputtering (PSS) Technique for MOCVD–Cu Damascene Interconnects." *IEEE*. pp. 635–638.

Meckl, P. H. and K. Umemoto. Apr. 2000. "Achieving Fast Motions by Using Shaped Reference Inputs [Semiconductor Manufacturing Machine] (Abstract)." *NEC Research and Development*, vol. 41, No. 2, pp. 232–237.

Chemali, Chadi El, James Moyne, Kareemullah Khan, Rock Nadeau, Paul Smith, John Colt, Jonathan Chapple–Sokol, and Tarum Parikh. Jul./Aug. 2000. "Multizone Uniformity Control of a Chemical Mechanical Polishing Process Utilizing a Pre– and Postmeasurement Strategy." J. Vac. Sci. Technol. A, vol. 18(4). pp. 1287–1296. American Vacuum Society.

Oechsner, R., T. Tschaftary, S. Sommer, L. Pfitzner, H. Ryssel, H. Gerath, C. Baier, and M. Hafner. Sep. 2000. "Feed–forward Control for a Lithography/Etch Sequence (Abstract)." *Proceedings of the SPIE—The International Society for Optical Engineering Conference*, vol. 4182, pp. 31–39.

Cheung, Robin. Oct. 18, 2000. "Copper Interconnect Technology." *AVS/CMP User Group Meeting*, Santa Clara, CA.

Khan, S., M. Musavi, and H. Ressom. Nov. 2000. "Critical Dimension Control in Semiconductor Manufacturing (Abstract)." *ANNIE 2000. Smart Engineering Systems Design Conference*, pp. 995–1000. St. Louis, Missouri.

ACM Research Inc. 2000. "Advanced Copper Metallization for 0.13 to 0.05 μm & Beyond." <http://acmrc.com/press/ACM–ECP–brochure.pdf>.

Ravid, Avi, Avner Sharon, Amit Weingarten, Vladimir Machavariani, and David Scheiner, 2000. "Copper CMP Planarity Control Using ITM." *IEEE/SEMI Advanced Semiconductor Manufacturing Conference*, pp. 437–443.

SEMI. 2000. "Provisional Specification for CIM Framework Scheduling Components." San Jose, California. SEMI E105–1000.

Yamagishi, H., Z. Tokei, G.P. Beyer, R. Donaton, H. Bender, T. Nogami, and K. Maex. 2000. "TEM/SEM Investigation and Electrical Evaluation of a Bottomless I–PVD TA(N) Barrier in Dual Damascene" (Abstract). *Advanced Metallization Conference 2000*. San Diego, CA.

2000. "Microsense II Capacitance Gaging System." www.a-detech.com.

Chen, Argon and Ruey–Shan Guo. Feb. 2001. "Age–Based Double EWMA Controller and Its Application to CMP Processes." *IEEE Transactions on Semiconductor Manufacturing*, vol. 14, No. 1, pp. 11–19.

Mar. 5, 2001. "KLA–Tencor Introduces First Production-worthy Copper CMP In–situ Film Thickness and End–point Control System." http://www.kla–tencor.com/j/servlet/NewsItem?newsItemID=74.

Lee, Brian, Duane S. Boning, Winthrop Baylies, Noel Poduje, Pat Hester, Yong Xia, John Valley, Chris Koliopoulus, Dale Hetherington, HongJiang Sun, and Michael Lacy. Apr. 2001. "Wafer Nanotopography Effects on CMP: Experimental Validation of Modeling Methods." San Francisco, California: Materials Research Society Spring Meeting.

Tobin, K. W., T. P. Karnowski, L. F. Arrowood, and F. Lakhani. Apr. 2001. "Field Test Results of an Automated Image Retrieval System (Abstract)." *Advanced Semiconductor Manufacturing Conference, 2001 IEEE/SEMI*, Munich, Germany.

Tan, K. K., H. F. Dou, and K. Z. Tang. May–Jun. 2001. "Precision Motion Control System for Ultra–Precision Semiconductor and Electronic Components Manufacturing (Abstract)." $51^{st}$ *Electronic Components and Technology Conference 2001. Proceedings*, pp. 1372–1379 Orlando, Florida.

Jensen, Alan, Peter Renteln, Stephen Jew, Chris Raeder, and Patrick Cheung. Jun. 2001. "Empirical–Based Modeling for Control of CMP Removal Uniformity." Solid State Technology, vol. 44, No. 6, pp. 101–102, 104, 106. Cowan Publ. Corp.: Washington, D.C.

Jul. 5, 2001. "Motorola and Advanced Micro Devices Buy ObjectSpace Catalyst Advanced Process Control Product for Five Wafer Fabs." Semiconductor FABTECH. www.semiconductorfabtech.com/industry.news/9907/20.07.shtml.

Heuberger, U. Sep. 2001. "Coating Thickness Measurement with Dual–Function Eddy–Current & Magnetic Inductance Instrument (Abstract)." *Galvanotechnik*, vol. 92, No. 9, pp. 2354–2366+IV.

Pilu, Maurizio. Sep 2001. "Undoing Page Curl Distortion Using Applicable Surfaces." *IEEE International Conference on Image Processing*. Thessalonica, Greece.

Oct. 15, 2001. Search Report prepared by the Austrian Patent Office for Singapore Patent Application No. 200004286–1.

Eisenbraun, Eric, Oscar van der Straten, Yu Zhu, Katharine Dovidenko, and Alain Kaloyeros. 2001. "Atomic Layer Deposition (ALD) of Tantalum–Based Materials for Zero Thickness Copper Barrier Applications" (Abstract). *IEEE*. pp. 207–209.

Smith, S.R., K.E. Elers, T. Jacobs, V. Blaschke, and K. Pfeifer. 2001. "Physical and Electrical Characterization of ALD Tin Used as a Copper Diffusion Barrier in 0.25 mum, Dual Damascene Backened Structures" (Abstract). *Advanced Metallization Conference 2001*. Montreal, Quebec.

Wang, LiRen and Hefin Rowlands. 2001. "A Novel NN–Fuzzy–SPC Feedback Control System." $8^{th}$*IEEE International Conference on Emerging Technologies and Factory Automation*, pp. 417–423.

NovaScan 2020. Feb. 2002. "Superior Integrated Process Control for Emerging CMP High–End Applications."

Mar. 15, 2002. Office Action for U.S. Appl. No. 09/469,227, filed Dec. 22, 1999.

Mar. 29, 2002. Office Action for U.S. Appl. No. 09/363,966, filed Jul. 29, 1999.

Moyne, J., V. Solakhian, A. Yershov, M. Anderson, and D. Mockler–Herbert. Apr.–May 2002. "Development and Deployment of a Multi–Component Advanced Process Control System for an Epitaxy Tool (Abstract)." *2002 IEEE Advanced Semiconductor Manufacturing Conference and Workshop*, pp. 125–130.

Sarfaty, Moshe, Arulkumar Shanmugasundram, Alexander Schwarm, Joseph Paik, Jimin Zhang, Rong Pan, Martin J. Seamons, Howard Li, Raymond Hung, and Suketu Parikh, Apr.–May 2002. "Advance Process Control Solutions for Semiconductor Manufacturing." Boston, Massachusetts: $13^{th}$*Annual IEEE/SEMI Advanced Semiconductor Manufacturing Conference. Advancing the Science and Technology of Semiconductor Manufacturing. ASMC 2002*, pp. 101–106.

Campbell, W. J., S. K. Firth, A. J. Toprac, and T. F. Edgar. May 2002. "A Comparison of Run–to–Run Control Algorithms (Abstract)." *Proceedings of 2002 American Control Conference*, vol. 3, pp. 2105–2155.

Good, Richard and S. Joe Qin. May 2002. "Stability Analysis of Double EWMA Run–to–Run Control with Metrology Delay." *IEEE/CPMT International Electronics Manufacturing Technology Symposium*, pp. 355–363.

Smith, Stewart, Anthony J. Walton, Alan W. S. Ross, Georg K. H. Bodammer, and J. T. M. Stevenson. May 2002. "Evaluation of Sheet Resistance and Electrical Linewidth Measurement Techniques for Copper Damascene Interconnect." *IEEE Transactions on Semiconductor Manufacturing*, vol. 15, No. 2, pp. 214–222.

Johnson, Bob. Jun. 10, 2002. "Advanced Process Control Key to Moore's Law." Gartner, Inc.

Jun. 20, 2002. Office Action for U.S. Appl. No. 09/619,044, filed Jul. 19, 2000.

Itabashi, Takeyuki, Hiroshi Nakano, and Haruo Akahoshi. Jun. 2002. "Electroless Deposited CoWB for Copper Diffusion Barrier Metal." *IEEE International Interconnect Technology Conference*, pp. 285–287.

Jul. 9, 2002. International Search Report for PCT/US01/24910.

Jul. 23, 2002. Communication Pursuant to Article 96(2) EPC for European Patent Application No. 00 115 577.9.

Jul. 29, 2002. International Search Report for PCT/US01/27407.

Sep. 26, 2002. Office Action for U.S. Appl. No. 09/637,620, filed Aug. 11, 2000.

Oct. 4, 2002. International Search Report for PCT/US01/22833.

Oct. 15, 2002. International Search Report for PCT/US02/19062.

Oct. 23, 2002. International Search Report for PCT/US01/27406.

Oct. 23, 2002. Office Action for U.S. Appl. 09/469,227, filed Dec. 22, 1999.

Nov. 7, 2002. International Search Report for PCT/US02/19061.

Nov. 11, 2002. International Search Report for PCT/US02/19117.

Nov. 12, 2002. International Search Report for PCT/US02/19063.

Dec. 17, 2002. Office Action for U.S. Appl. No. 09/363,966, filed Jul. 29, 1999.

ACM Research, Inc. 2002. "ACM Ultra ECP® System: Electro–Copper Plating (ECP) Deposition." www.acmrc.com/ecp.html.

Applied Materials, Inc. 2002. "Applied Materials: Information for Everyone: Copper Electrochemical Plating." www.appliedmaterials.com/products/copper_plating.html.

Elers, Kai–Erik, Ville Saanila, Pekka J. Soininen, Wei–Min Li, Juhana T. Kostamo, Suvi Haukka, Jyrki Juhanoja, and Wim F.A. Besling. 2002. "Diffusion Barrier Deposition on a Copper Surface by Atomic Layer Deposition" (Abstract). *Advanced Materials*. vol. 14, No. 13–14, pp. 149–153.

Kim, Y.T. and H. Sim. 2002. "Characteristics of Pulse Plasma Enhanced Atomic Layer Deposition of Tungsten Nitride Diffusion Barrier for Copper Interconnect" (Abstract). *IEIC Technical Report*. vol. 102, No. 178, pp. 115–118.

KLA–Tencor Corporation. 2002. "KLA Tencor: Press Release: KLA–Tencor Introduces First Production–Worthy Copper CMP In–Situ Film Thickness and End–point Control System: Multi–Million Dollar Order Shipped to Major CMP Tool Manufacturer." www.kla–tencor.com/news_events/press_releases/press_releases2001/984086002.html.

Peng, C.H., C.H. Hsieh, C.L. Huang, J.C. Lin, M.H. Tsai, M.W. Lin, C.L. Chang, Winston S. Shue, and M.S. Liang. 2002. "A 90nm Generation Copper Dual Damascene Technology with ALD TaN Barrier." *IEEE*. pp. 603–606.

Sonderman, Thomas. 2002. "APC as a Competitive Manufacturing Technology: *AMD's Vision for 300nm*." AEC/APC.

Takahashi, Shingo, Kaori Tai, Hiizu Ohtorii, Naoki Komai, Yuji Segawa, Hiroshi Horikoshi, Zenya Yasuda, Hiroshi Yamada, Masao Ishihara, and Takeshi Nogami. 2002. "Fragile Porous–Low–k/Copper Integration by Using Electro–Chemical Polishing." *2002 Symposium on VLSI Technology Digest of Technical Papers*, pp. 32–33.

Van der Straten, O., Y. Zhu, E. Eisenbraun, and A. Kaloyeros. 2002. "Thermal and Electrical Barrier Performance Testing of Ultrathin Atomic Layer Deposition Tantalum–Based Materials for Nanoscale Copper Metallization." *IEEE*. pp. 188–190.

Wu, Z.C., Y.C. Lu, C.C. Chiang, M.C. Chen, B.T. Chen, G.J. Wang, Y.T. Chen, J.L. Huang, S.M. Jang, and M.S. Liang. 2002. "Advanced Metal Barrier Free Cu Damascene Interconnects with PECVD Silicon Carbide Barriers for 90/65–nm BEOL Technology." *IEEE*. pp. 595–598.

2002. "Microsense II—5810: Non–Contact Capacitance Gaging Module." www.adetech.com.

Feb. 10, 2003. Office Action for U.S. Appl. No. 09/619,044, filed Jul. 19, 2000.

Mar. 25, 2003. International Search Report for PCT/US02/24859.

Apr. 9, 2003. Office Action for U.S. Appl. No. 09/928,474, filed Aug. 14, 2001.

May 8, 2003. Office Action for U.S. Appl. No. 09/637,620, filed Aug. 11, 2000.

May 23, 2003. Written Opinion for PCT/US01/24910.

Jun. 18, 2003. Office Action for U.S. Appl. No. 09/655,542, filed Sep. 6, 2000.

Jul. 23, 2003. Invitation to Pay Additional Fees and Communication Relating to the Results of the Partial International Search for PCT/US02/19116.

Jul. 25, 2003. International Search Report for PCT/US02/24858.

Aug. 1, 2003. Written Opinion for PCT/US01/27406.

Aug. 8, 2003. PCT International Search Report from PCT/US03/08513.

Aug. 20, 2003. Written Opinion for PCT/US01/22833.

Aug. 25, 2003. Office Action for U.S. Appl. No. 10/100,184, filed Mar. 19, 2002.

Sep. 15, 2003. Office Action for U.S. Appl. No. 09/928,474, filed Aug. 14, 2001.

Oct. 14, 2003. PCT International Search Report from PCT/US02/21942.

Oct. 20, 2003. PCT International Search Report from PCT/US02/19116.

Oct. 23, 2003. PCT International Preliminary Examination Report from PCT/US01/24910.

Nov. 5, 2003. Office Action for U.S. Appl. No. 10/172,977, filed Jun. 18, 2002.

Dec. 1, 2003. Office Action for U.S. Appl. No. 10/173,108, filed Jun. 18, 2002.

"NanoMapper wafer nanotopography measurement by ADE Phase Shift." Printed Dec. 9, 2003. http://www.phase–shift.com/nanomap.shtml.

"Wafer flatness measurement of advanced wafers." Printed Dec. 9, 2003. http://www.phase–shift.com/wafer–flatness.shtml.

"ADE Technologies, Inc.—6360." Printed Dec. 9, 2003. http://www.adetech.com/6360.shtml.

"3D optical profilometer MicroXAM by ADE Phase Shift." Printed Dec. 9, 2003. http://www.phase–shift.com/microxam.shtml.

"NanoMapper FA factory automation wafer nanotopography measurement." Printed Dec. 9, 2003. http://www.phaseshift.com/nanomapperfa.shtml.

Dec. 11, 2003. Office Action for U.S. Appl. No. 09/943,383, filed Aug. 31, 2001.

Dec. 16, 2003. International Search Report for PCT/US03/23964.

Cunninhgham, James A. 2003. "Using Electrochemistry to Improve Copper Interconnects." <http://www.e–insite.net/semiconductor/index.asp?layout=article&articleid=CA47465>.

Jan. 20, 2004. Office Action for U.S. Appl. No. 09/927,444, filed Aug. 13, 2001.

Jan. 23, 2004. International Search Report for PCT/US02/24860.

Feb. 2, 2004. Office Action for U.S. Appl. No. 09/363,966, filed Jul. 29, 1999.

Mar. 30, 2004. Written Opinion for PCT/US02/19062.

Apr. 9, 2004. Written Opinion for PCT/US02/19116.

Apr. 22, 2004. Office Action for U.S. Appl. No. 09/998,372, filed Nov. 30, 2001.

Apr. 28, 2004. Written Opinion for PCT/US02/19117.

Apr. 29, 2004. Written Opinion for PCT/US02/19061.

May 5, 2004. Office Action for U.S. Appl. No. 09/943,955, filed Aug. 31, 2001.

May 5, 2004. International Preliminary Examination Report for PCT/US01/27406.

May 28, 2004. Office Action for U.S. Appl. No. 09/943,383, filed Aug. 31, 2001.

Jun. 3, 2004. Office Action for U.S. Appl. No. 09/928,474, filed Aug. 14, 2001.

Jun. 23, 2004. Office Action for U.S. Appl. No. 10/686,589, filed Oct. 17, 2003.

Jun. 30, 2004. Office Action for U.S. Appl. No. 09/800,980, filed Mar. 8, 2001.

Jul. 12, 2004. Office Action for U.S. Appl. No. 10/173,108, filed Jun. 8, 2002.

Adams, Bret W., Bogdan Swedek, Rajeev Bajaj, Fritz Redeker, Manush Birang, and Gregory Amico. "Full–Wafer Endpoint Detection Improves Process Control in Copper CMP." *Semiconductor Fabtech*—$12^{th}$ Edition. Applied Materials, Inc., Santa Clara, CA.

Berman, Mike, Thomas Bibby, and Alan Smith. "Review of In Situ & In–line Detection for CMP Applications." *Semiconductor Fabtech*, $8^{th}$ Edition, pp. 267–274.

Dishon, G., D. Eylon, M. Finarov, and A. Shulman. "Dielectric CMP Advanced Process Control Based on Integrated Monitoring." Ltd. Rehoveth, Israel: Nova Measuring Instruments.

"Semiconductor Manufacturing: An Overview." <http://users.ece.gatech.edu/~gmay/overview.html>.

* cited by examiner

DYNAMIC OFFSET AND FEEDBACK THRESHOLD

CROSS-REFERENCE TO RELATED APPLICATIONS

This application is related to co-pending application entitled "Improved Process Control By Distinguishing a White Noise Component of a Process Variance," filed on even date herewith and incorporated by reference.

BACKGROUND OF THE INVENTION

1. Field of the Invention

The present invention concerns computer-implemented and/or computer-enabled methods, systems, and mediums for enabling improved feedback and feedforward control during process control. More specifically, one or more embodiments of the present invention relate to run-to-run control, including determining offset and feedback threshold values during real-time process control, particularly in connection with semiconductor manufacturing.

2. Description of the Related Art

Detecting and controlling errors during a manufacturing process is an important goal. This is particularly true in connection with the process of manufacturing semiconductors. During the manufacturing process, various measurements are made in order to detect and/or determine errors e.g., to detect when an observed value differs significantly from an intended target result. When the difference is sufficient, the manufacturing process control system will attempt to control (e.g., compensate for) the error so as to continue to produce products (e.g., chips) that are within acceptable ranges or tolerances from the target result. The difference between the target and measured values that will trigger a compensation operation is known as the threshold error or feedback threshold.

It has been observed that material such as a wafer that is processed in connection with a semiconductor manufacturing process will inevitably include at least some error or some deviation from the intended target result or specification. In order to determine when it is desired to perform additional control in order to make an adjustment during processing, conventional systems utilize a feedback threshold as a trigger. Whenever a compensation or control operation is triggered and the adjustment is made, however, the result following the adjustment still will usually deviate from the intended target result. Further, there are tolerances within which a tighter adjustment of a control does not effectively cause the material to be processed closer to specification, since the control is simply not capable of a sufficiently fine adjustment.

Conventionally, control of an error is attempted when one or more preconditions assigned to the tolerance range for the target specification using a statistical approach are satisfied. The conventional statistical approach employs a standard deviation. Nevertheless, even when the process control system uses standard deviation as the threshold value, there is always a lack of precision, or a tolerance range within which it is not truly possible to control more tightly.

Typically, a statistical process variance or standard deviation that is determined under optimal conditions as an estimation of processing error. Specifically, current methods predetermine the amount of an observed output that is unadjustable process noise, and thus the range that the controller cannot further improve upon, in an open-loop (i.e., no feedback). This predetermined amount is then applied to (e.g., subtracted from) the actual measurements derived from the device, process and/or material being measured. Thus, statistical process variance measured while the process, material to be processed, and processing device conditions are at an atypically pristine state is used as a substitute for what would otherwise be a truer (e.g., more real world) measurement of a process variance. The measurement at this atypical condition is then used as an estimation of the processing variance occurring throughout the manufacturing process under consideration.

Statistical use of standard deviation in connection with observed deviation is illustrated, for example in "Statistical feedback control of a plasma etch process", P. Mozumder et al., IEEE Transactions on Semiconductor Manufacturing, Vol. 7, No. 1 (February 1994). The statistical variance $S_k$ at the kth run is calculated using the standard deviation as:

$$S_k = \sqrt{\frac{1}{n-1}\left[\sum_{i=1}^{n} x_{k-i+1}^2 - n(\bar{x})^2\right]} \quad (1)$$

where, n=number of samples x=deviation of observed value from predicted value

The conventional process control system compares the observed standard deviation to a threshold in order to determine if the deviation is acceptable. Once the standard deviation greater than the threshold is detected, the process model's tuning procedures for increasing control are invoked. In the conventional process control method, the standard deviation is used to determine the level for the threshold or trigger. Within the threshold, it is assumed that the deviation cannot be sufficiently controlled.

The conventional use of measurements at pristine conditions in estimating threshold error, despite its industry acceptance, is not a reasonably accurate reflection of process error during real manufacturing conditions. One of many reasons that measurements at pristine conditions do not reasonably reflect true conditions is that materials such as wafers processed in most front and back end processing devices in the semiconductor industry have relationships or effects on subsequently processed wafers between runs ("run-to-run"). Accordingly, conditions applied to and/or affected by wafers that were previously processed in a processing device will have residual effects on wafers that are currently being processed in that processing device. An estimation of threshold error derived from measurements taken while the processing device is at a steady state, consequently, does not reflect the fluctuations introduced during run-to-run processing.

Therefore, there remains a need to have improved control, particularly within a tolerance range associated with a target specification. There also remains a need to address the effects of run-to-run conditions on such measurements.

SUMMARY OF THE INVENTION

The present invention provides a way to determine the error within standard deviation that is caused by two components: a white noise component and a signal component (such as systematic errors). The white noise component is random noise and therefore is relatively non-controllable. The systematic errors, in contrast, may be controlled by changing the control parameters in a manufacturing process. A ratio between the two components is calculated autoregressively. Based on the ratio and using the observed or measured error (as, e.g., typically made over the course of several measurements), the actual value of the error caused by the white noise is calculated. The actual value of the error is then used in determining whether and how to change the control parameters of the manufacturing. The autoregressive stochastic sequence addresses the issue of real-time control of the effects of run-to-run deviations, and provides a mechanism that can extract white noise from the statistical process variance in real time. This results in an ability to provide tighter control of feedback and feedforward variations.

In one aspect of the invention, a computer-implemented method is provided for determining a process threshold for updating a process recipe or process model in a manufacturing process for a plurality of products. The method includes the steps of (a) inputting a model for a manufacturing process having at least one control parameter that predicts a value for a product characteristic and that sets a process threshold for modifying the model; (b) receiving an observed value at least one product and calculating a variance between the observed value and the predicted value; (c) using the variance in an auto-regressive stochastic sequence to calculate a first portion of the variance caused by white noise and a second portion of the variance caused by a systematic or controllable error over the plurality of products; and (d) using one of the first and second portions of the variance to update the process threshold of the model.

In one or more embodiments, the portion of the variance caused by white noise is used to update the process threshold.

BRIEF DESCRIPTION OF THE DRAWING

The present invention is described with reference to the following figures. Throughout this discussion, similar elements are referred to by similar numbers in the various figures for ease of reference. The above mentioned and other features and advantages of the present invention will become more readily apparent from the following detailed description and the accompanying drawings, in which.

DETAILED DESCRIPTION OF THE INVENTION

Process control is used in semiconductor manufacturing to maintain one or more characteristics of the product, e.g., a semiconductor wafer, to within acceptable and predictable ranges. In implementing process control, a model of the process is developed that predicts wafer characteristics for a given set of input conditions. A manufacturing recipe is obtained based in whole or in part on the model. A product characteristic of interest is monitored during processing, and variations in the product output from the target value are used to provide a feedback loop for updating the deposition recipe in the process control box, as is shown schematically in FIG. 1.

Figure 1:
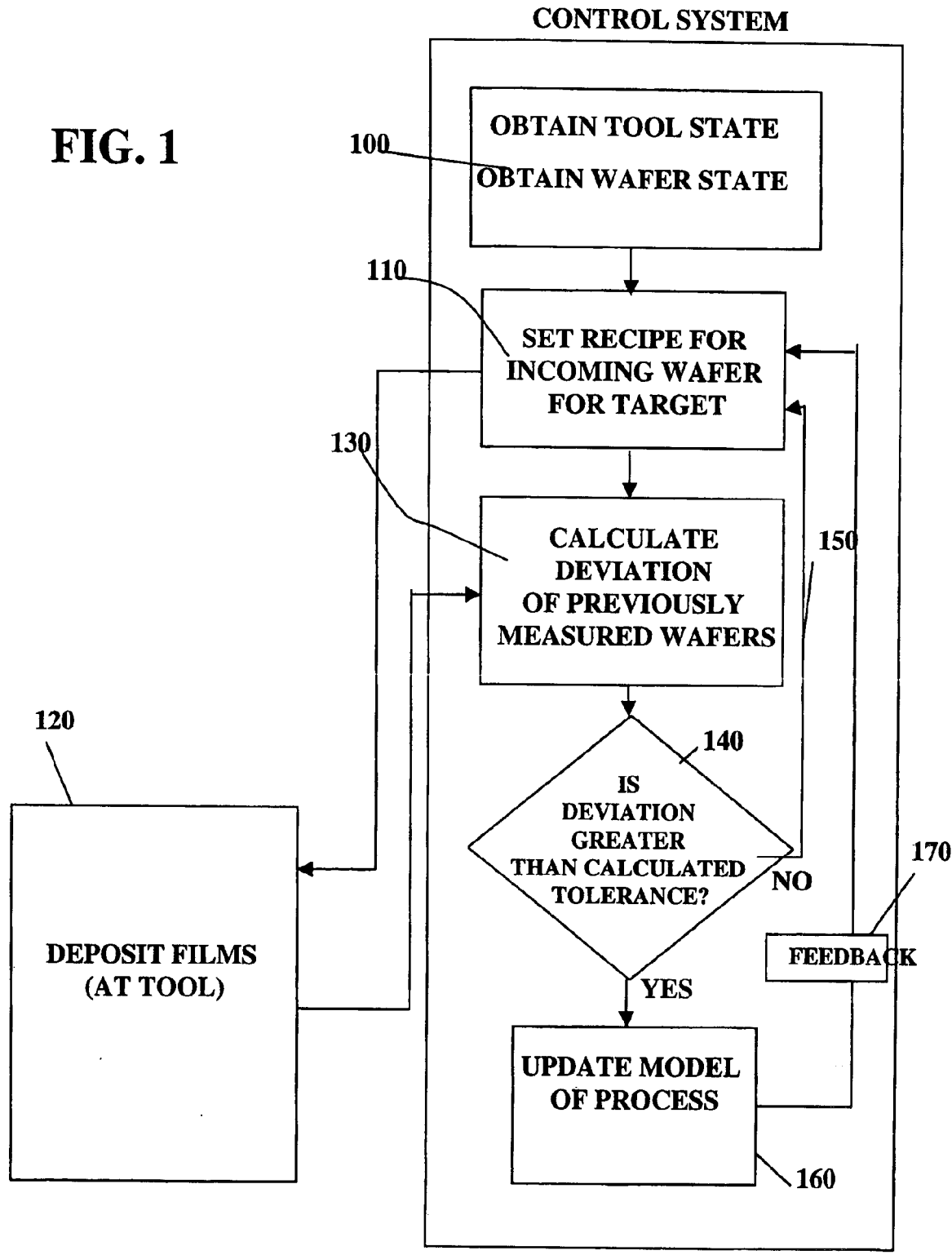
FIG. 1 is a flow diagram of a feedback loop used in a process controlled operation according to one or more embodiments of the present invention.

According to the processing flow diagram in FIG. 1, initial processing conditions (e.g., an initial tool state and initial wafer state) are identified that will provide a desired wafer property in step 100. The initial conditions may be determined empirically or by using the processing model. If a processing model is used, a controller can use this model to calculate processing times and processing parameters (i.e., to set the recipe for one or more incoming wafers) to produce a wafer having a target characteristic, as shown in step 110. The wafer is processed at step 120 according to the initial recipe. The characteristic of interest is measured and deviation from the predicted value is determined in step 130. In step 140 it is determined whether the deviation between the predicted and observed behavior exceeds an established threshold (the feedback threshold). If the deviation is within acceptable ranges, no changes are made to the model and the recipe is unchanged (step 150). If the deviation is outside acceptable limits, then this information is marked to trigger a change in the model as described in step 160 and this information is fed back to the model in step 170 and thus into the controller where the processing recipe is optimized according to an updated model that takes the deviation from the predicted value into consideration.

Conditions encountered while processing are such that conditions applied to previously processed materials (e.g., wafers) have some residual effects on the condition of the processing device in connection with the current wafers being processed, including both white noise and controllable errors. If a wafer was processed through a particular chamber in a processing device, resulting in a particular chamber condition, that chamber condition has some inertia, which can have a residual effect on subsequent conditions of the chamber. The next wafer to be processed in that chamber will be affected due to the inertia of the previous chamber condition. Furthermore, as the processing recipe is refined in response to updates and improvements of the processing model used in the process control system, the uncontrollable error generated or experienced by the process may diminish. Thus, the magnitude of uncontrollable error may vary in real time during the manufacturing process. In one or more embodiments of the present invention, a feedback threshold value is calculated for a manufacturing process that reflects these real time conditions in the manufacturing process.

Some portion of the measurement is actually due to white noise, which represents an uncontrollable error. One example of white noise in a semiconductor manufacturing system is a disturbance in ambient temperature, which is neither measured nor controlled, but which would result in a change in thickness of the product. When determining whether an error occurred and/or how much to control an error that may occur during the manufacturing process, both systematic variance and white noise should be identified, as only systematic error can be affected by the processing conditions. The standard deviation calculation used in the prior art does not distinguish between systematic variation and white noise variation as a part of the error. Hence, conventionally both the systematic and white noise variations are controlled together, rather than separately.

In one or more embodiments of the present invention, the value of white noise is extracted from the statistical process variance, for example by utilizing an autoregressive stochastic sequence such as the one described below. This permits tighter control of error, which is helpful according to one or more embodiments of the present invention in determining a dynamic threshold for tighter feedback and/or feed forward control, while taking into consideration the real time run-to-run conditions relating to the process, material, and/or processing device.

In one or more embodiments of the present invention, an $n^{th}$ order autoregressive stochastic sequence may be used to express the effect of systematic variation and white noise on observed error. In one or more embodiments, such a relationship may be expressed as:

$$X_k = \rho_1 * X_{k-1} + \rho_2 * X_{k-2} + \ldots + \rho_n * X_{k-n} + W_k \quad (2)$$

where $W_k$=white noise
$\rho_n$=auto-correlation coefficient at lag n at run k
$X_k$=controlled output at run k
lag n=relationship between every $n^{th}$ wafer For at least some applications, the effects of the wafer immediately preceding the current wafer (lag 1) are adequate to define the overall effect of previously processed wafers on the current wafer, and the run-to-run control of the wafers simplifies to:

$$X_k = \rho_1 * X_{k-1} + W_k, \quad (3)$$

where $\rho_1 = \dfrac{C_k}{C_0}$ where $C_k$=autocorrelation factor, and $$C_k = \frac{1}{N} \sum_{t=1}^{N-n} (Z_t - Z_{ave})(Z_{t+k} - Z_{ave})_{k=1,2\ldots n} \quad (5)$$

where N=total number of samples
n=lag
$Z_t$=value for sample t
$Z_{ave}$=average value for all N samples
For a lag of 1, the autocorrelation factor is defined as:

$$C_k = \frac{1}{N} \sum_{t=1}^{N-1} (Z_t - Z_{ave})(Z_{t+1} - Z_{ave}). \quad (6)$$

To extract the noise from the relationship set forth in equation (3), the variance analysis may be taken in two steps according to one or more embodiments of the invention. First, $$V_x = \rho^1{}_2 * V_x + V_w \quad (7)$$

where w=white noise
x=systematic error
$V_x$=variance of the systematic error
$V_w$=variance of the white noise
Next, $$\delta_w/\delta_x = (1-\rho_1^2)^{0.5} \quad (8)$$

where $\delta$ represents the standard deviation.
The standard deviation of the observed value ($\delta_N$) may be expressed as:

$$\delta_N = \delta_x + \delta_w \quad (9)$$

where $\delta_x$=a value representing the variation that a system can control (i.e., a systemic component)
$\delta_w$=a value representing the random variation that is relatively non-controllable (i.e., the white noise component)
From equation (9), the following can be derived:

$$\delta_N = y \quad (10)$$

where y=calculated value from N samples of the previous wafers, and, $\delta_w/\delta_x = z \quad (11)$ where z=calculated value from equation (8)

From equations (8), (9), (10) and (11), it follows that:

$$\delta_x = y/(1+z). \quad (12)$$

Wafers that have been processed in a sequence (run-to-run) by a given device or system typically have a relationship to each other in terms of a variance that they create. In summary, equation (3) is one example of taking into consideration the run-to-run control of wafers; it addresses information representative of the sequence and the relationship between the wafers and the sequence. Based on the ratio between the white noise and the observed error in the signal, it can be determined what the total amount of error is. By using feed forward analysis, the process in which error is observed can be appropriately controlled. Referring to equation (9), the observed value now has been differentiated into two portions, one of which is white noise and the other of which is the potentially controllable deviation, also referred to as systematic deviation.

The foregoing sequence is but an example of the relationships that may be used to express the effect of systematic variance and white noise on a controlled output. Other relationships may be used in accordance with one or more embodiments of the invention to define the relationship between the two.

Consider for instance that a chemical mechanical polishing (CMP) processing device will be used in a semiconductor process control system to polish twenty-five wafers. $X_k$ is wafer twenty-five, $X_k-1$ is wafer twenty-four, etc. Because of the relationship and effect run-to-run wafers have on each other, the analysis used herein refers back to the previous wafer(s) (i.e., $X_k$, $X_k-1$, etc.) in determining how much control effectively may be applied to $X_k$, the wafer presently being processed.

Figure 2:
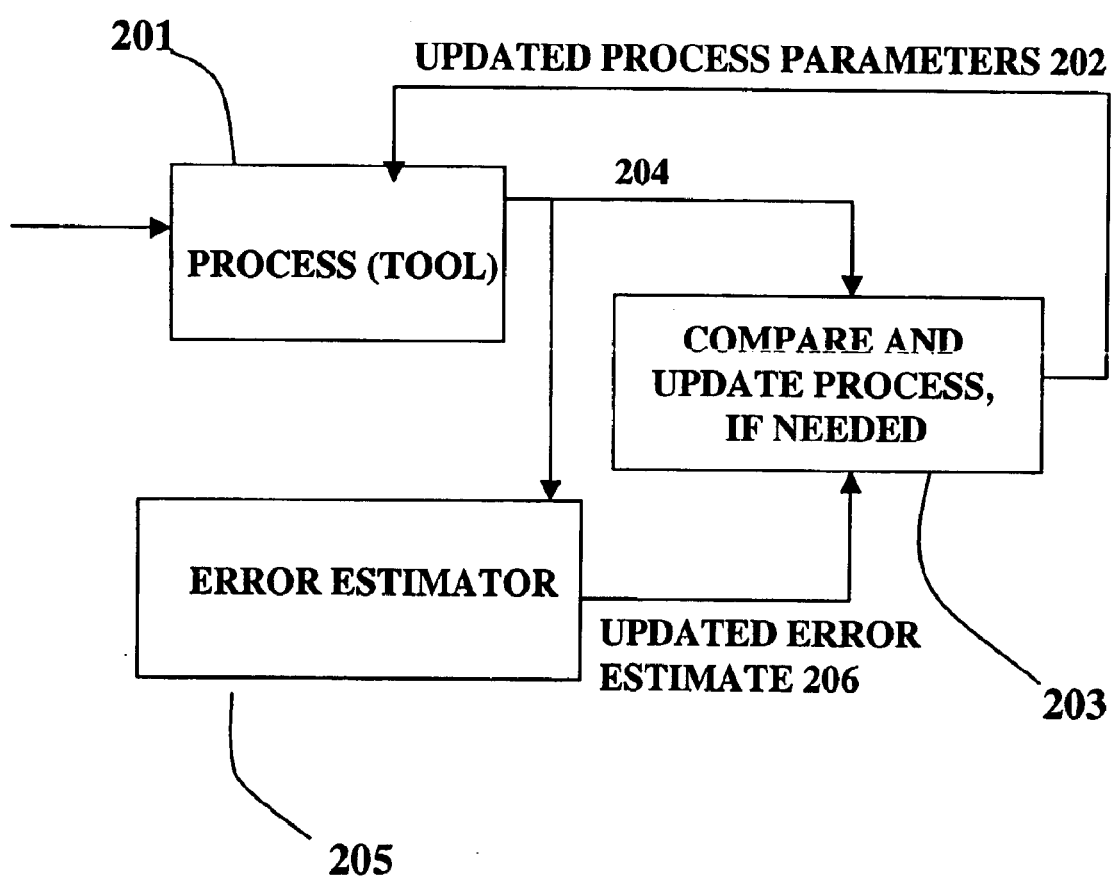
FIG. 2 is a block diagram of a recursive parameter estimation for use in connection with one or more embodiments of the present invention.

In one or more embodiments of the present invention, error estimation is integrated into a process control system, such as is shown in FIG. 1. Referring to FIG. 2, an integrated system is described that includes a process control and an estimator system according to one or more embodiments of the present invention. Process block 201 receives input control parameter 202 values, performs a manufacturing process according to the input control parameter values and the process recipe, and produces an output indicative of the actual measured value for the wafer characteristic of interest. As shown in FIG. 2, block 203 compares the observed and predicted values of a characteristic of interest and uses the difference in a feedback mechanism to update the processing parameters. Either the process model or the process recipe can be updated Estimator block 205 performs a white noise estimation for the series of N samples based upon measured values (output from 201) using for example an autoregressive stochastic system (such as equation (2)). The extracted estimation of white noise is used to update the error tolerances (process threshold) of the process model. The updated estimation of white noise is input into block 203 for use as a process threshold in comparing the measured and predicted values of a characteristic of interest. The feedback mechanism of comparing the measured against the predicted output values takes place at 203, and the threshold is the on/off mechanism for the decision to control the process for the next wafer at, the process control block 201 updated process parameters, if needed, are input into the process control block 201.

In one or more embodiments of the present invention, the calculated white noise portion of the variance is used as a weighing factor to adjust an estimated gain that is used as a weighing factor in the determination of updated process parameters. In one or more embodiments of the present invention the model includes two or more control parameters, both of which can be adjusted using the estimated gain.

The conventional method would condition control on a conventional threshold based on an open loop control output data, whereas the current method provides a dynamic threshold. The difference between the two methods is exemplified in the following example. Table 1 illustrates simulated data comparing the calculation of a threshold using standard deviation to the calculation of a threshold with an embodiment of the present invention. In Table 1, the number of minimum samples is N=10.

TABLE 1

| Sample Number | Simulated Sample Output Values | Threshold with Standard Deviation | Threshold with the Invention |
|---|---|---|---|
| 1 | 3927 | | |
| 2 | 3893 | | |
| 3 | 3797 | | |
| 4 | 3713 | | |
| 5 | 3627 | | |
| 6 | 3602 | | |
| 7 | 3694 | | |
| 8 | 3732 | | |
| 9 | 3753 | | |
| 10 | 3781 | 45.0 | 14.1 |
| 11 | 3739 | 45.0 | 12.3 |
| 12 | 3694 | 45.0 | 9.2 |
| 13 | 3684 | 45.0 | 7.8 |
| 14 | 3673 | 45.0 | 7.8 |
| 15 | 3743 | 45.0 | 7.9 |
| 16 | 3753 | 45.0 | 5.4 |
| 17 | 3746 | 45.0 | 5.1 |
| 18 | 3710 | 45.0 | 5.3 |
| 19 | 3736 | 45.0 | 5.3 |

As shown in the above simulated data, the conventional process control system utilizes a threshold calculated to be at 45.0 using an open-loop standard deviation calculation. In other words, the conventional standard deviation approach fixes the threshold or trigger at the open-loop standard deviation. Where the observed values are within the threshold, the process control system, e.g., the process of determining the best recipe for meeting a target output, does not attempt to control the error, whereas if the values are outside the threshold, the process control system does attempt to control the error. In contrast, the threshold calculated utilizing the invention is dynamic and varies by presenting a sensitive threshold in real-time for feedback and feedforward control.

In the simulated example, the sample pool has N=10. For the first 10 wafers, a feedback threshold of 45 is used for both systems to determine whether to adjust the processing model to better control the output target. During these 10 wafers, the model is updated to achieve the target output, but the feedback threshold remains the same. The conventional process continues to use the open-loop standard deviation at a threshold. For the exemplary process according to one or more embodiments of the present invention, however, the first 10 samples are used in a recursive parameter estimation process and the feedback threshold is adjusted downward. Each successive sample is subjected to recursive parameter estimation using the previous 10 samples. The threshold varies from 14.1 down to 5.1 in the simulated data in Table 1 and appears to converge at a value of about 5.3. This represents a more accurate estimation of the white noise error in the process.

Values within the threshold can be disregarded since they cannot be effectively controlled. On the other hand, outside the threshold it is possible and useful to control the deviation. The reason that one ignores the value below the threshold is that this represents the calculated noise, and noise is not controllable. Once the threshold has been defined more accurately, as with the present invention, better control can be provided. Hence, the present invention offers a more sensitive detection and/or control of true errors than the conventional process control system utilizing a fixed threshold.

Figure 3:
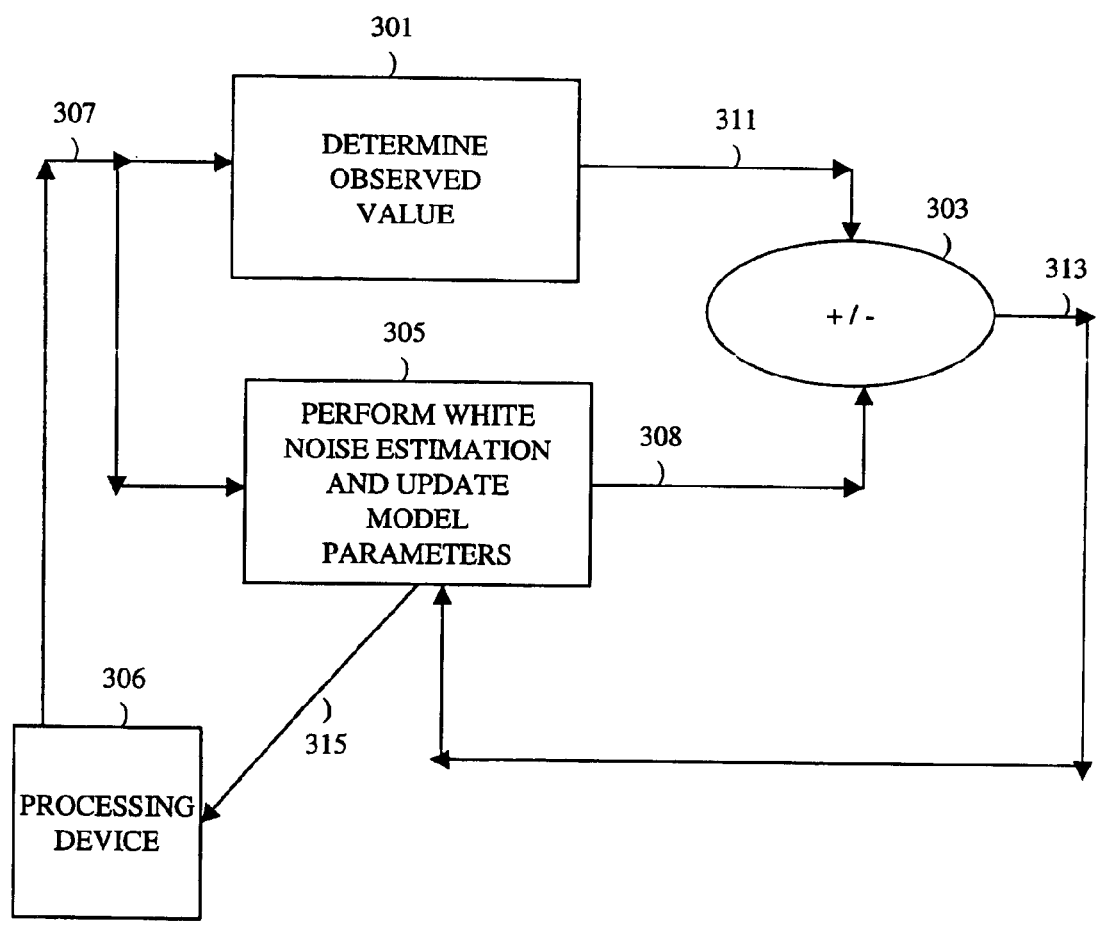
FIG. 3 is a block diagram of an example of the recursive parameter estimation according to one or more embodiments of the present invention.

Reference is now made to FIG. 3, a block diagram illustrating use of one or more embodiments of the invention in connection with a chemical mechanical polishing ("CMP") process. However, it is not intended to limit the invention to CMP, as it can be applied in connection with a number of processes, such as chemical vapor deposition ("CVD"), or etching or many other processes within the semiconductor industry. Moreover, the present invention may also be used with types of process control system, in addition to the semiconductor industry, which are concerned with measurement of true error as discriminated from observed error.

In the CMP process example of FIG. 3, processing device 306 controls the conventional controls of pressure, state, time, flow rate, etc., in connection with the wafers that are to be polished. At block 306, the polish processing device treats wafers according to the parameters describing the polish process. The measured values (or raw data from which these values can be generated) 307 for wafer samples are obtained from processing device 306 and used by block 301 to determine an observed value and by block 305 to estimate white noise using recursive parameter estimation and to update model parameters. Using the updated error estimation, block 305 updates the model parameters, and produces a predicted value 308 that is what the measured value is expected to be. Block 301 determines and outputs observed, actual measurements 311 of the wafers after they have been polished. The difference 313 between the actual measurements 311 and the predicted value 308 from the estimator block 305 is determined in block 303. Block 303 determines the error in the prediction, which is then further input into the estimator block 305, to be used as feedback in connection with the recursive parameter estimation, to avoid over-reacting to the noise, that may be present in the observed, actual measurement. According to one or more embodiments of the invention, the noise is approximately extracted by the estimator block 305 utilizing the autoregressive stochastic sequence. The updated model parameters 315 are provided to the processing device 306 for further sample processing.

Figure 4:
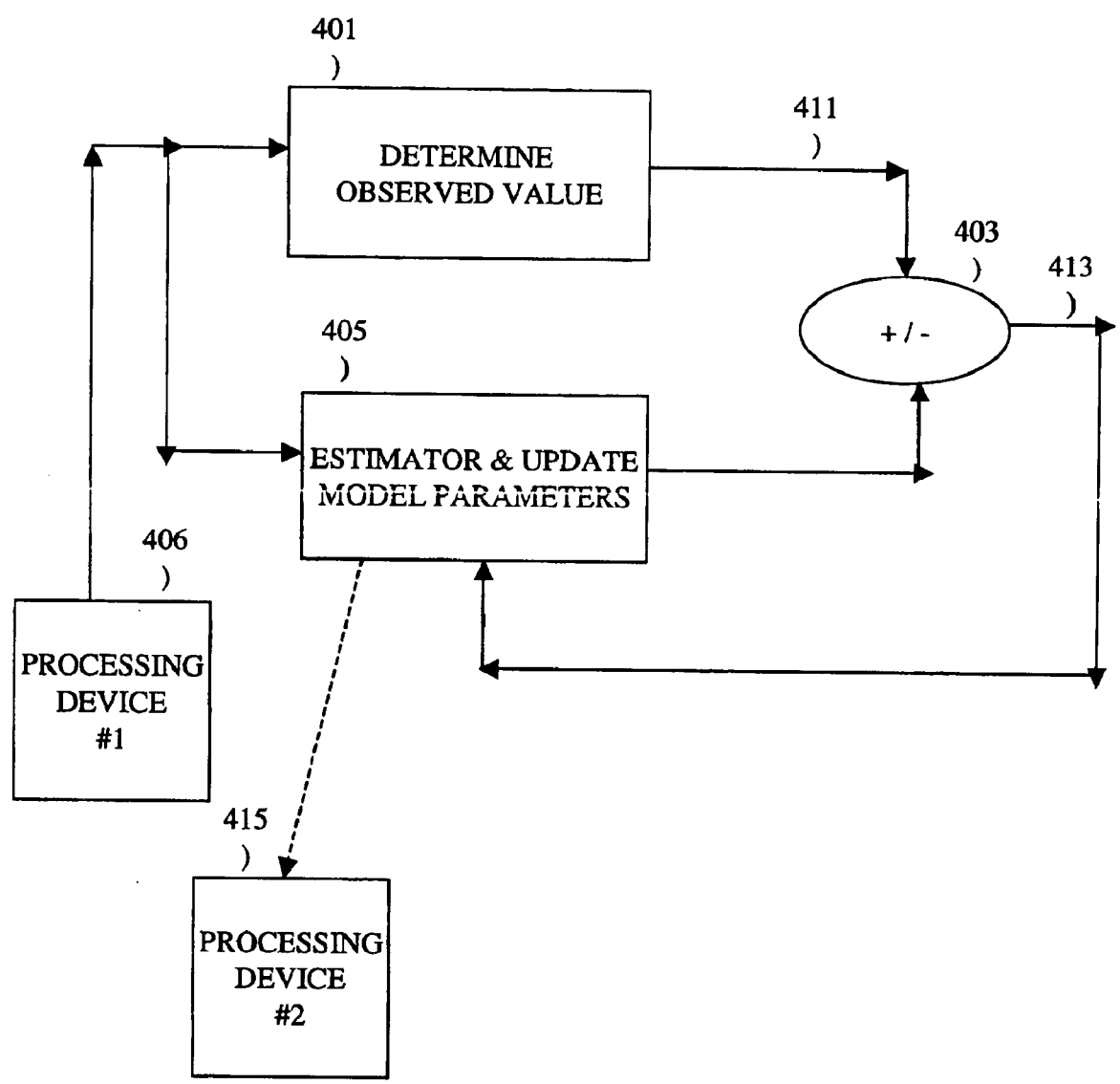
FIG. 4 is a block diagram of recursive parameter estimation according to one or more embodiments of the invention.

As an example of another use of the invention, consider that a specification is provided which requires the process control system to produce wafers of a certain thickness, among other things, so that a target thickness is indicated. In this particular processing sequence example, shown in FIG. 4, two processing devices 406, 415 are utilized in sequence, so that the second processing device can compensate for the first processing device (e.g., CMP). Referring to FIG. 4, the process block 401 outputs the observed measurements 411 obtained from the first processing device 406, in order to ultimately be used for making adjustments to the second processing device 415. Those outputs are utilized in determining the variance, or predicted error, 413 at block 403 of the observed values from the predicted values. The predicted error 413 is then utilized to make adjustments to the second processing device 415, after being adjusted for white noise via the estimator and update model parameters block 405, preferably utilizing the autoregressive stochastic sequence discussed above. By so doing, the second processing device compensates for deficiencies and variances caused by the first processing device, such that according to this example, the wafers produced from the second processing device are within the range of specified target thickness.

In the above description, the measurement of the products is described as being taken in relation to a pre-determined specification. The measurements also could be taken in relation to a real-time calculation based on prior measurements. In accordance with at least one or more embodiments, multiple specifications could be provided.

Figure 5:
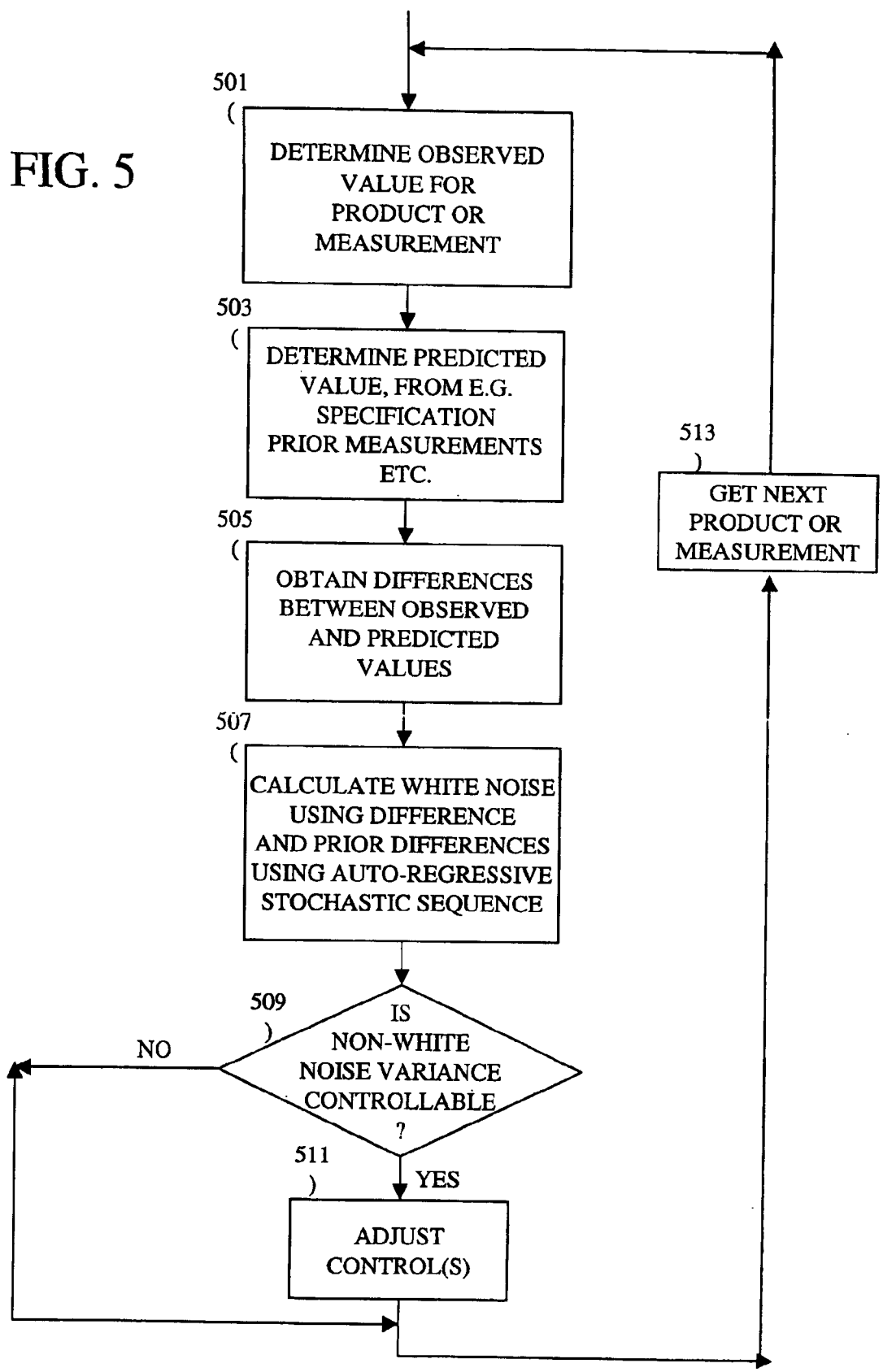
FIG. 5 is a flow chart of the recursive parameter estimation, utilizing the invention illustrated in FIG. 2.

FIG. 5 is a flow chart representing one or more embodiments of the present invention. At step 501, the observed value for the product (or other measurement) is determined. At step 503, the predicted value is determined, including for example from a specification or from a prior measurement. At step 505, the difference, or predicted error, between the observed value and the predicted value is obtained. At step 507, the white noise portion of the observed error is calculated, using the current and prior observed errors, in an auto regressive, stochastic sequence. At step 509, it is determined whether the non-white noise portion of the observed error is controllable. If so, the system may adjust the control parameters 511. At step 513, the system gets the next product to be measured, or obtains the next measurement.

Also, as described above, the difference between the measurements of the product, such as a wafer, and the specification for that product is calculated. However, the process control system may also calculate a statistical variance between such measurements and the specification. As described above, the specification could be pre-determined or could be based on a real-time calculation, such as determined by prior measurements.

From the difference or variance between observed values and predicted values, the process control system may, in effect, calculate two portions, as explained above. The first portion is indicative of that portion of the difference caused by random noise, random variance, and/or normal deviation. The second portion determined by the system is indicative of the difference or variation caused by a systematic error or systematic variance over two or more products. Both the first and second portions are calculated from a statistical variance. The ability to separate white noise from the statistical variance to obtain information about white noise during real-time provides more accurate determinations of error than the aforementioned conventional techniques and may lead to improved test and yield analysis. Alternatively (or additionally), the differentiation is performed, but not on a real-time basis.

If the actual variance exceeds a threshold, the process control system then may or may not attempt to control the process. For example, the process control system may adjust one or more control parameters that affect the process and that are relevant to the processing device, such as gas pressure, temperature, etc., thereby controlling the production environment. Hence, the process may be more tightly controlled, based upon the calculated second portion of the differences or variance.

Figure 6:
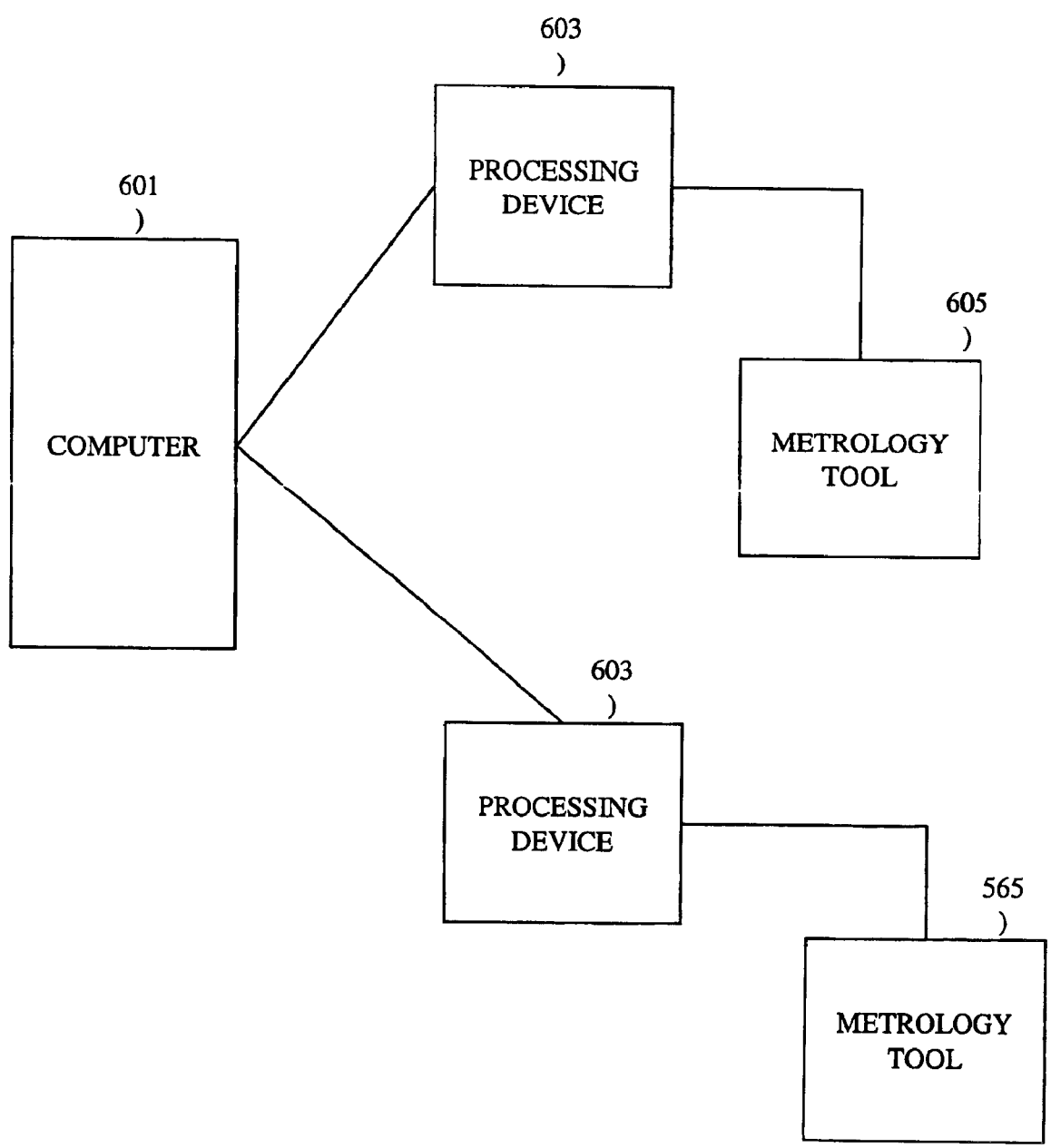
FIG. 6 is a block diagram of a computerized process control system, which may be used in connection with one or more embodiments of the present invention.

The present invention may be particularly useful within any numbers of industries (such as the semiconductor industry) in connection with obtaining higher quality, increased throughput, lower cost of operation; and shorter ramp-up time. It is suitable for use in process control systems concerned with, for example, wafer-to-wafer thickness control, uniformity control, within-wafer range control, defect analysis and/or control, etch critical dimension control, chemical vapor deposition thickness and/or uniformity control, physical vapor deposition uniformity and/or thickness control, metrology variations, and other process control, analysis, and/or measurement situations and processing devices. Other parameters that can be controlled in connection with semiconductor manufacturing include applying or changing electrical power, placing different gases into a chamber, changing distances between electrodes, etc. There are numerous variables in semiconductor manufacturing that are to be measured and variances that may be controlled. The present invention is suitable for use in these situations As one example, the process control system may include a general purpose computer 601 as illustrated in FIG. 6, or a specially programmed special purpose computer. It may also be implemented as a distributed computer system rather than a single computer; some of the distributed systems might include embedded systems. Further, the programming may be distributed among one or more processing devices 603 themselves or other parts of the process control system. Similarly, the processing could be controlled by a software program on one or more computer systems or processors, or could be partially or wholly implemented in hardware. Moreover, the process control system may communicate directly or indirectly with the relevant processing devices and/or components thereof, such as metrology tools 605. As another alternative, the portion of the process control system that is relevant may be embedded in the processing device itself.

As another example, the system may be implemented on a web based computer, e.g., via an interface to collect and/or analyze data from many sources. It may be connected over a network, e.g., the Internet, an Intranet, or even on a single computer system. Moreover, portions of the system may be distributed (or not) over one or more computers, and some functions may be distributed to other hardware, such as tools, and still remain within the scope of this invention. The user may interact with the system via e.g., a personal computer or over PDA, e.g., the Internet, an intranet, etc. Either of these may be implemented as a distributed computer system rather than a single computer. Similarly, a communications link may be a dedicated link, a modem over a POTS line, and/or any other method of communicating between computers and/or users. Moreover, the processing could be controlled by a software program on one or more computer systems or processors, or could even be partially or wholly implemented in hardware.

User interfaces may be developed in connection with an HTML display format. It is possible to utilize alternative technology for displaying information, obtaining user instructions and for providing user interfaces. The system used in connection with the invention may rely on the integration of various components including, as appropriate and/or if desired, hardware and software servers, database engines, and/or other process control components. The configuration may be, alternatively, network-based and may, if desired, use the Internet as an interface with the user.

The system according to one or more embodiments of the invention may store collected information in a database. An appropriate database may be on a standard server, for example, a small Sun™ Sparc™ or other remote location. The information may, for example, optionally be stored on a platform that may, for example, be UNIX-based. The various databases maybe in, for example, a UNIX format, but other standard data formats may be used.

Although the process control system is illustrated as having a single computer, the system according to one or more embodiments of the invention is optionally suitably equipped with a multitude or combination of processors or storage devices. For example, the computer may be replaced by, or combined with, any suitable processing system operative in accordance with the principles of embodiments of the present invention, including sophisticated calculators, hand held, laptop/notebook, mini, mainframe and super computers, one or more embedded processors, as well as processing system network combinations of the same. Further, portions of the system may be provided in any appropriate electronic format, including, for example, provided over a communication line as electronic signals, provided on floppy disk, provided on CD Rom, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an interpretive environment such as Java and transported to multiple destinations to various users.

The invention may include a process and/or steps. Where steps are indicated, they may be performed in any order, unless expressly and necessarily limited to a particular order. Steps that are not so limited may be performed in any order.

As another example, deviation has been described as controlled above a certain threshold. In certain situations, it would be appropriate to consider deviation as controllable in an inverse manner. In other situations, deviation may have a range, above and below which control is possible.

The foregoing detailed description includes many specific details. The inclusion of such detail is for the purpose of illustration only and should be understood to limit the invention. In addition, features in one embodiment may be combined with features in other embodiments of the invention. Various changes may be made without departing from the spirit and scope of the invention as defined in the following claims.

What is claimed is:

1. A computer-implemented method for determining a process threshold for updating a process model in a manufacturing process, comprising the steps of:
   (a) inputting a model for a manufacturing process having at least one control parameter that predicts a value for a product characteristic and that sets a process threshold for modifying the model;
   (b) receiving an observed value for at least one product and determining a variance between the observed value and the predicted value;
   (c) using the variance to calculate a first portion of the variance caused by white noise and a second portion of the variance caused by a systematic variance over the plurality of products; and
   (d) using either the first or second portion of the variance to update the process threshold of the model.

2. The method of claim 1, wherein the variance is determined from the observed values for N previously processed products.

3. The method of claim 1, wherein the first portion represents the variance caused by white noise.

4. The method of claim 1, wherein the first portion of the variance caused by white noise is used to update the process threshold of the model.

5. The method of claim 1, further comprising the step of:
   using the first portion of the variance caused by white noise to update the at least one control parameter of the model.

6. The method of claim 5, wherein the calculated white noise portion of the variance is used as a weighing factor to adjust an estimated gain in the updating of the at least one control parameter.

7. The method of claim 1, wherein the model comprises two or more control parameters.

8. The method of claim 1, wherein first and second portions of the variance are determined using an autoregressive stochastic sequence.

9. The method of claim 1, wherein the relationship between the first and second portions of the variance is defined as:

$$V_x = \rho_1^2 * V_x + V_w$$

where w=white noise
x=systematic error
$V_x$=variance of the systematic error
$V_w$=variance of the white noise.

10. The method of claim 1, wherein the relationship between the first and second portions of the variance is defined as:

$$\delta_x = y/(1+z),$$

where is $\delta_x$ represents the second portion of the variance,
y=calculated standard deviation from N previous products, and
$z=(1-\rho_1^2)^{0.5}$, where $\rho_1$ is an autocorrelation factor for a lag of 1.

11. The method of claim 2, wherein N is in the range of 5 to 100.

12. The method of claim 2, wherein N is in the range of 10 to 40.

13. The method of claim 1, wherein the manufacturing process includes at least one device on which the plurality of products is processed, the observed value being relative to the at least one device, the at least one device including the at least one control parameter, wherein a step of controlling the at least one control parameter includes affecting the at least one device.

14. The method of claim 13, wherein the manufacturing process includes a plurality of devices including a first device and a second device on which the plurality of products including the at least one product are processed, the observed value being relative to the first device, the second device including the at least one control parameter, wherein the step of controlling the at least one control parameter includes affecting at least the second device.

15. The method of claim 3, wherein the white noise includes at least one of random variance, normal deviation, and an ambient fluctuation.

16. A computer program product for determining a process threshold for updating a process recipe in a manufacturing process for a plurality of products, the computer program product comprising:
(a) at least one computer readable medium, readable by the manufacturing process;
(b) instructions, provided on the at least one computer readable medium, for inputting a model for a manufacturing process having at least one control parameter that predicts a value for a product characteristic and that sets a process threshold for modifying the model;
(c) instructions, provided on the at least one computer readable medium, for receiving at least one observed value for the product and calculating a variance between the observed value and the predicted value;
(d) instructions, provided on the at least one computer readable medium, for using the variance in an autoregressive stochastic sequence to calculate a first portion of the variance caused by white noise and a second portion of the variance caused by a systematic variance over the plurality of products; and
(e) instructions, provided on the at least one computer readable medium, for updating the process threshold based upon the first portion of the variance caused by white noise.

17. The computer program product of claim 16, wherein the values are observed for products including semiconductor wafers, and the computer readable medium is readable by a manufacturing process including an automated semi-conductor manufacturing process.

18. The computer program product of claim 16, wherein the predicted value is derived from a specification, the specification being selected from at least one of a predetermined specification, and a real-time calculation taken from a plurality of prior observed values of products.

19. The computer program product of claim 16, wherein the manufacturing process has at least one control parameter capable of being controlled, further comprising instructions, provided on the computer readable medium, for controlling the at least one control parameter during a manufacturing process based on the calculated white noise portion of the variance.

20. The computer program product of claim 16, further comprising instructions, on the computer readable medium, for observing the value for each product of the plurality of products; determining at least the white noise portion of the variance for each product of the plurality of products and utilizing the white noise portion of the variance as a threshold; and determining whether or not to execute the controlling instructions for each product when the measured value is outside the threshold.

21. The computer program product of claim 20, wherein the manufacturing process includes at least one device on which the plurality of products including the at least one product is processed, the observed value being relative to the at least one device, the at least one device including the at least one control parameter, wherein the instructions for controlling the at least one control parameter includes affecting the at least one device.

22. The computer program product of claim 21, wherein the manufacturing process includes a plurality of devices including a first device and a second device on which the plurality of products including the at least one product are processed, the observed value being relative to the first device, the second device including the at least one control parameter, wherein the instructions for controlling the at least one control parameter includes affecting at least the second device.

23. The computer program product of claim 16, wherein the white noise includes at least one of random variance, normal deviation, and an ambient fluctuation.

24. The computer program product of claim 16, wherein the relationship between the first and second portions of the variance is defined as:

$$V_x = \rho_1^2 * V_x + V_w$$

where w=white noise
x=systematic error
$V_x$=variance of the systematic error
$V_w$=variance of the white noise.

25. The computer program product of claim 16, wherein the relationship between the first and second portions of the variance is defined as:

$$\delta_x = y/(1+z),$$

where is $\delta_x$ represents the second portion of the variance,
y=calculated standard deviation from N previous products, and
$z=(1-\rho_1^2)^{0.5}$, where $\rho_1$ is an autocorrelation factor for a lag of 1.

26. A system for determining a process threshold for updating a process model in a manufacturing process, comprising the steps of:
(a) means for modeling a manufacturing process having at least one control parameter that predicts a value for a product characteristic and that sets a process threshold for modifying the model;
(b) means for receiving an observed value for at least one product and determining a variance between the observed value and the predicted value;
(c) calculating means for determining a first portion of the variance caused by white noise and a second portion of the variance caused by a systematic variance; and
(d) calculating means for updating the process threshold of the model using either the first or second portion of the variance.

27. The method of claim 1, further comprising the steps of:
observing the value for each product of the plurality of products; and
determining whether or not to perform the controlling step for each product when the observed value is outside the process threshold.

* * * * *